United States Patent [19]

Bales et al.

[11] Patent Number: 5,185,742
[45] Date of Patent: Feb. 9, 1993

[54] TRANSPARENT SIGNALING FOR REMOTE TERMINALS

[75] Inventors: Bruce M. Bales, Louisville; Robert L. Crumpley, Westminster; Sandra S. North, Golden; Stephen M. Thieler, Boulder, all of Colo.

[73] Assignee: AT&T Bell Laboratories, Murray Hill, N.J.

[21] Appl. No.: 636,522

[22] Filed: Dec. 31, 1990

[51] Int. Cl.⁵ .............................................. H04J 3/12
[52] U.S. Cl. .............................. 370/110.1; 370/94.1; 379/93
[58] Field of Search .................. 370/110.1, 94.1, 94.2, 370/60, 60.1; 379/93, 96, 102

[56] References Cited

U.S. PATENT DOCUMENTS

| | | | |
|---|---|---|---|
| 4,656,623 | 4/1987 | Dalby, Jr. et al. | 370/60 |
| 4,764,919 | 8/1988 | Hunter et al. | 370/60 |
| 4,988,209 | 1/1991 | Davidson et al. | 370/58.1 |
| 5,001,710 | 3/1991 | Gawrys et al. | 370/110.1 |
| 5,012,512 | 4/1991 | Basso et al. | 379/96 |
| 5,014,266 | 5/1991 | Bales et al. | 370/110.1 |
| 5,023,780 | 6/1991 | Brearley | 370/60 |
| 5,023,868 | 6/1991 | Davison et al. | 370/62 |
| 5,036,535 | 7/1991 | Gechter et al. | 379/210 |
| 5,051,991 | 9/1991 | Taniguchi et al. | 370/110.1 |
| 5,062,103 | 10/1991 | Davidson et al. | 370/58.1 |

OTHER PUBLICATIONS

J. C. Borum, "The 5ESS Switching System: Hardware Design", *AT&T Technical Journal*, vol. 64, No. 6 Part 2 (Jul.-Aug. 1985) pp. 1417-1437.

Primary Examiner—Douglas W. Olms
Assistant Examiner—H. Kizou
Attorney, Agent, or Firm—John C. Moran

[57] ABSTRACT

A remote telecommunication terminal providing telecommunication functions identical to those functions provided by local telecommunication terminal directly connected to a telecommunications system via a direct standard link using a standard protocol. The remote telecommunication terminal is interconnected to the telecommunication system through an intervening switching system such as the public telephone network. One such remote telecommunication terminal is a remote telemarketing terminal. A remote telemarketing terminal cooperates with the telemarketing system to establish a virtual interface on the telemarketing system. The telemarketing system views this virtual interface as being identical to a physical interface such as one connected to a local telemarketing terminal via a standard link. The remote telemarketing terminal then establishes a virtual link between itself and the virtual interface on the telemarketing system. The virtual link is established on transport channels of standard links that interconnect the remote telemarketing terminal to the switching system and from the switching system to the telemarketing system. The switching system is unaware of the establishment of a virtual link on these transport channels and does not respond to signaling information on a virtual signaling channel of the virtual link.

52 Claims, 12 Drawing Sheets

TRANSPARENT SIGNALING FOR REMOTE TERMINALS

TECHNICAL FIELD

This invention relates to the communication of control information, and, in particular, to the control of remote telephone station sets and remote telemarketing terminals.

BACKGROUND OF THE INVENTION

Telemarketing is an important and rapidly growing segment of the telecommunication industry. Using ISDN signaling as defined by ISDN standard Q.931, telecommunication systems functioning as telemarketing systems (such as the AT&T Definity Telecommunication System) provide many useful features that enhance the service provided to customers. A telemarketing agent who uses a modern telemarketing terminal that has combined voice and data capabilities is not only provided a voice connection but also a wealth of data displayed on the terminal from a centralized database.

Prior art telemarketing systems have only been able to provide combined voice and data features to telemarketing terminals which are co-located with the telemarketing system or which are connected to the telemarketing system via dedicated lines. These two constraints have resulted in the necessity of grouping telemarketing agents in dedicated office facilities. Since the telemarketing agents must leave their homes, this grouping means that the agents in general must work full time.

For telemarketing services for airline reservations, retail marketing for large companies, or information lines for large companies, the requirement that telemarketing agents be grouped in the same physical location and working full time is not only acceptable but probably desirable from a many points of view such as supervision and morale. However, there are telemarketing services that only require telemarketing agents for a few hours each day. One such service is responding to calls resulting from a television commercial. In addition, there are many people in our society today who want to work on a part time basis at home. Many of these people are highly qualified to function as telemarketing agents. The problem has been in being able to provide telemarketing terminals to these people at home that have the same capabilities as telemarketing terminal provided to grouped telemarketing agents. This problem is a communication problem resulting from the manner in which the public telephone system functions. Nor does ISDN signaling as defined by the ISDN standard solve this problem for reasons outlined in the following paragraphs.

ISDN signaling is intended to provide an international standard to control the initialization of calls, maintenance of calls, termination of calls, communication of national use information, local serving network information, and user-specific information for telecommunications systems and terminals. The ISDN standard defines two standard links: (1) primary rate interface (PRI) links, each having 23 data channels (B channels) and one signaling channel (D channel), and (2) basic rate interface (BRI) links, each having two B channels and one D channel.

The ISDN message format allows each message to have a number of information elements (IEs) and groups IEs by codesets. There are eight possible codesets, numbered 0-7. Codeset 0 is the currently defined set of information elements for call control and includes IEs that control the initialization, maintenance, and termination of calls. Codesets 1-4 are reserved for future ISDN standard Q.931 expansion. Codeset 5 is for national use; codeset 6 is for IEs specific to the local serving network; and codeset 7 is for user-specific IEs.

In a system having a plurality of switching nodes, the problem with ISDN signaling is that each intervening switching node in the signaling path must process messages that communicate the signaling information because each intervening switching node terminates the signaling channel. Because of this message processing, the following three major problems are created.

First, each intervening switching node processes and interprets all IEs (codeset 0) relating to the control of initiation, progress, and termination of calls. The result is that a telemarketing terminal cannot be remotely connected to a controlling switching node through intervening switching nodes using standard links if standard signaling is used for call control. Telemarketing terminals can only be remotely connected if non-standard signaling is used for call control or if dedicated links are used. However, non-standard signaling requires that both the controlling switching node and the controlled telemarketing terminal function differently than if the controlled telemarketing terminal is directly connected to the controlling switching node.

The second problem is that if standard signaling is used, the transmission rate of signaling information is greatly reduced because of the need to process that information in each intervening switching node.

And thirdly, a large additional processing load is placed on the intervening switching nodes.

As previously described, the ISDN standard is intended for a telemarketing terminal to be directly controlled via the signaling channel by the local switching node to which the telemarketing terminal is attached since any intervening switching node processes and interprets all IEs performing call control. Hence, the ISDN standard is adequate for most types of telecommunications applications. Nonetheless, this standard suffers from serious problems when it is desirable to remote a telemarketing terminal from a controlling switching node through another switching node such as a public network. In order to implement such remote applications, the remote telemarketing terminal must function in a different manner if ISDN call control signaling is not used, or dedicated links must be used if ISDN call control signaling is used.

The most disadvantageous result of not being able to use standard signaling without dedicated links is that the remote telemarketing terminal cannot be utilized in the same manner as a telemarketing terminal directly connected to the controlling switching node. Whereas telemarketing demonstrates the need for remote equipment, there are many other applications where it is desirable to remote terminal equipment from the controlling switching node and to allow that equipment to have the same capabilities as if it were directly connected to the controlling switching node. For example, when the controlling switching node is a PBX, it is desirable to control a small number of telephones at a remote location. Because of the distance involved, it is often desirable to connect this terminal equipment to the PBX via the public network. Office personnel operating procedures make it desirable for the users of the remote terminal equipment to be provided the same functions as the users of the terminal equipment directly connected to the PBX. However, for a small number of remote users, it is not economical to put a switching system at the remote location capable of terminating a PRI link and switching the channels from this link to the users.

SUMMARY OF THE INVENTION

A technical advance is achieved by a remote telecommunication terminal and method to provide telecommunication functions identical to those functions provided by a local telecommunication terminal directly connected to a telecommunications system by a direct standard link using a standard protocol. The remote telecommunication terminal is interconnected to the telecommunication system through an intervening switching system such as the public telephone network. One such remote telecommunication terminal is a remote telemarketing terminal capable of providing identical functions to those provided by local telemarketing terminals directly connected to a telemarketing system.

Each remote telemarketing terminal cooperates with the telemarketing system to establish a virtual interface on the telemarketing system. The telemarketing system views this virtual interface as being identical to a physical interface such as one connected to a local telemarketing terminal via a standard link. The remote telemarketing terminal then establishes a virtual link between itself and the virtual interface on the telemarketing system. The virtual link is established on transport channels of standard links that interconnect the remote telemarketing terminal to the switching system and from the switching system to the telemarketing system. The switching system is unaware of the establishment of a virtual link on these transport channels and does not respond to signaling information on the virtual link.

The remote telemarketing terminal establishes a virtual signaling channel and virtual transport channels on the virtual link in accordance with the same standard protocol utilized on the standard links interconnecting the local telemarketing terminals to the telemarketing system. The telemarketing system controls the telemarketing functions of the remote marketing terminal by transmitting signaling information via the virtual interface and the virtual signaling channel to the remote telemarketing terminal in the same manner as the telemarketing system controls a local telemarketing terminal via the signaling channel of the standard links connected to the local telemarketing terminals.

In a preferred embodiment, the standard links may be either ISDN PRI links or BRI links and the standard protocol may be the ISDN protocol.

The internal operations of the remote telemarketing terminal are controlled by a processor which executes software layers arranged in a hierarchical structure. The standard link interconnecting the remote telemarketing terminal to the switching system is terminated by a physical interface on the remote telemarketing terminal and has a signaling channel and transport channels in accordance with the ISDN standard. This physical interface is directly controlled by the lowest software layers. The virtual signaling channel is established on a channel of the standard link. The lowest software layers are responsive to encapsulated information received from the telemarketing system on the virtual signaling channel to communicate the encapsulated information to a virtual application software module in the highest software layer. This software module recovers the signaling information of the virtual signaling channel from encapsulated information and transfers it to a virtual link software module in the lowest software layers. In turn, the virtual link software module transfers the signaling information to an intermediate software layer. The intermediate software layer in combination with higher software layers processes the signaling information and performs the telemarketing functions specified by that signaling information.

When the intermediate and higher software layers have signaling information to be transmitted to the telemarketing system via the virtual signaling channel, they utilize the intermediate software layer to transfer that information to the virtual link software module. This transfer is performed in the same manner as if the intermediate software layer was transferring information to the lowest software layers, and as if those layers transmitted the information on the signaling channel of the standard link via the physical interface. In response, the virtual link software module transfers the signaling information to the virtual application software module. The virtual application software module encapsulates the information and communicates it to the lowest software layers for transmission by the physical interface on the standard link interconnected to the switching system.

Further in accordance with the invention, the virtual signaling channel may be communicated on a subchannel of one of the transport channels (B channel) of the standard link, on a logical link of the signaling channel (D channel) of the standard link, or by utilizing user communication facilities of the ISDN protocol on the D channel.

In addition to supporting remote telemarketing terminals, remote telecommunication terminals, such as BRI telephone sets, can operate in an identical manner to local telecommunication terminal directly connected to a telecommunication system in accordance with the principles of the invention described in the previous paragraphs for the remote telemarketing terminals.

Other and further aspects of the present invention will become apparent during the course of the following description and by reference to the accompanying drawing.

DETAILED DESCRIPTION

Telecommunication Remote Terminal Overview

Figure 1:
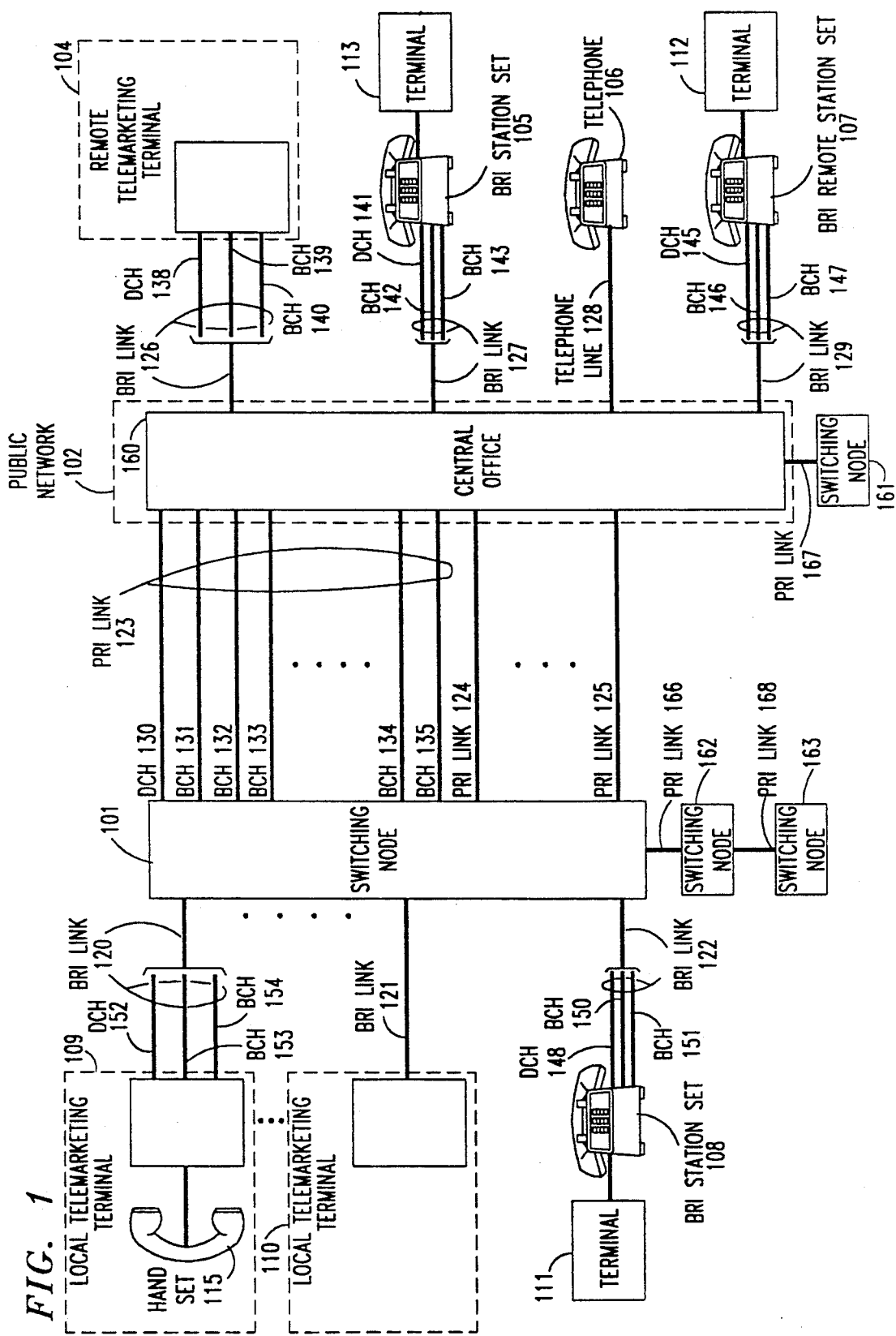
FIG. 1 illustrates, in block diagram form, a telecommunications switching system embodying the inventive concept.

FIG. 1 shows a communications system having a plurality of switching nodes and a public network for communication of information between a plurality of telephones, BRI station sets, and telemarketing terminals. Switching nodes 101, 161, 162, and 163, and BRI remote station set 107, and remote telemarketing terminal 104 function in accordance with the present invention. For illustration purposes only, public network 102 is illustrated as comprising only central office 160; however, public network 102 can include a variety of central offices and toll offices interconnected by the appropriate trunks.

In FIG. 1, switching node 101 directly controls the operation of local telemarketing terminals 109 through 110 via BRI links 120 through 121, respectively, and directly controls the operation of BRI station set 108 via BRI link 122. In accordance with the invention, switching node 101 communicates standard ISDN control information via a flexible rate interface (FRI) link, hereafter described. Using the FRI link, switching node 101 controls the operations of remote telemarketing terminal 104 and BRI remote station set 107 from a software architectural point of view in the same manner as it controls the operation of local telemarketing terminals 109 through 110 and BRI station set 108. Specifically, FRI links are established using the B channels in PRI link 123, central office 160, BRI link 126 and BRI link 129. Switching node 101 communicates information to remote telemarketing terminal 104 and BRI remote station set 107 via the FRI links rather than the D channels of PRI link 123 and BRI links 126 and 129. At the same time, switching node 101 communicates with central office 160 standard ISDN signaling information in the D channels of the PRI and BRI links. Central office 160 translates the signaling information from switching node 101 and directly controls the operations of BRI station set 105 and telephone 106 in a conventional ISDN manner. Switching nodes 161, 162, and 163 also have BRI station sets and local telemarketing terminals connected to them via BRI links. In certain cases, switching nodes 161, 162, and 163 communicate with central office 160 via switching node 101 and other switching nodes. For example, switching node 163 communicates with central office 160 via switching nodes 101 and 162. Switching nodes 161, 162, and 163 are similar to switching node 101 in both hardware and software.

The telemarketing terminals illustrated in FIG. 1 are similar in function to the Call Master 602A telemarketing terminal manufactured by AT&T. BRI station sets 105 and 108 are advantageously the AT&T 7507 station set. BRI remote station set 107 performs functions identical to those of the other BRI station sets but operates in accordance with the present invention. Similarly, remote telemarketing terminal 104 performs functions identical to those of other telemarketing terminals but performs these functions in accordance with the present invention.

A call processing application software module in switching node 101 performs call processing in the same manner for both BRI station sets 108 and 107. Similarly, a telemarketing application software module within switching node 101 performs the telemarketing functions in the same manner for local telemarketing terminals 109 through 110 and remote telemarketing terminal 104. Those telemarketing functions may be advantageously similar to automatic call directory (ACD) functions performed by a commercial private telecommunication system such as the AT&T Definity Generic 2 CS. Both software modules are written so that no distinction is made between a BRI station set (or telemarketing terminal) directly connected to switching node 101 or remotely connected via central office 160. Consequently, a user of BRI remote station set 107 is provided all of the capabilities that a user of BRI station set 108 has on switching node 101. These capabilities are important since switching node 101 may advantageously be a private telecommunications system providing elaborate features. The remote user is capable of performing his/her job in a more efficient manner than if he/she were using a telephone set for which a communication path had been established to switching node 101 via central office 160 using conventional call setup procedures.

To better understand the call capabilities provided by a FRI link, consider the following example of a normal ISDN call set up being performed by switching node 101 and central office 160 to establish a call between BRI station set 108 and BRI station set 105. Switching node 101 responds to signaling information that identifies BRI station 105 as the destination—that information is being received from BRI station set 108 via D channel 148—by exchanging the standard ISDN protocol messages with central office 160 via D channel 130 of PRI link 123. During call establishment, central office 160 transmits to BRI station set 105 call alerting and call setup messages via D channel 141 of BRI link 127. BRI station set 105 interacts with central office 160 to extend the call from PRI link 123 to BRI station set 105 via BRI link 127. Switching node 101 performs call establishment functions for BRI station set 108 that are similar to the functions which central office 160 performs for BRI station set 105.

As central office 160 receives signaling information via D channel 130 from switching node 101, central office 160 processes these messages to determine what function is to be performed as well as how that function is to be performed. Because of this processing of messages by central office 160, switching node 101 is limited in the manner in which it can deal with BRI station set 105. Specifically, the call processing application software module on switching node 101 cannot treat BRI station set 105 as if it were directly connected. The software module must set up calls through central office 160 as if BRI station set 105 were similar to analog telephone 106. For example, switching node 101 cannot provide a standard business communications feature such as intercom calling on BRI station set 105 because central office 160 is intervening. In order to provide such a feature, switching node 101 must directly communicate signaling information with BRI station set 105 as if the latter set were directly connected to switching node 101. It is this problem that the present invention solves as detailed in the following paragraphs with respect to BRI remote station set 107.

In accordance with the invention and in contradistinction to the foregoing call set-up example, control information is directly communicated between switching node 101 and BRI remote station set 107 via a FRI link. The FRI link comprises one FRI D channel and two B channels in direct analogy to the two B channels and one D channel of an ISDN BRI link. There are four embodiments for the FRI link, with the first embodiment being described here and the other three embodiments in later paragraphs. The first embodiment of the FRI link is established using B channels 146 and 147 of BRI link 129 and B channels 131 and 132 of PRI link 123. B channel 146 is subdivided into two subchannels, one of which is a packetized and serves as the FRI D channel and the other of which serves as one of the FRI B channels. B channel 147 serves as the other FRI B channel. Illustratively, the FRI B and FRI D channels supported by B channel 146 carry compressed voice and signaling information, respectively. B channels 146 and 147 are switched through central office 160 from BRI remote station set 107 to switching node 101 via B channels 131 and 132 of PRI link 123. That is, B channel 131 carries the FRI D channel and one FRI B channel while B channel 132 carries one other FRI B channel. Since signaling information for the FRI link is communicated on a B channel, central office 160 doesn't respond to that information but simply circuit switches the signaling information as if it were voice data. (D channels 130 and 145 are only used to establish the connection of the two B channels from BRI remote station set 107 to switching node 101 via central office 160.)

Consider the following example of switching node 101 initializing a FRI link to allow the operation of BRI remote station set 107. First, switching node 101 negotiates with central office 160 via an exchange of messages over D channel 130 for access to two B channels, assumed to be B channels 131 and 132. Switching node 101 accomplishes this task by transmitting standard ISDN messages to central office 160 to establish a call to BRI remote station set 107. Central office 160 exchanges standard ISDN messages with BRI remote station set 107 via D channel 145 to extend the call to BRI remote station set 107. After alerting and connecting BRI remote station set 107, central office 160 connects B channels 131 and 132 of PRI link 123 to B channels 146 and 147 of BRI link 129, respectively. Switching node 101 time multiplexes B channel 131 by inserting and receiving control information into and out of half of this channel (to create the FRI D channel) and compressed voice information into and out of the other half (to create one of the FRI B channels). In response to the call from switching node 101, BRI remote station set 107 also multiplexes B channel 146 in the same manner as switching node 101 multiplexed B channel 131 to create the FRI D and FRI B channels.

After establishment of the FRI link, BRI remote station set 107 responds to the signaling information of the FRI D channel in the same manner as BRI station set 105 responds to signaling information of D channel 141 from central office 160. After the establishment of this FRI link, switching node 101 and BRI remote station set 107 exchange standard ISDN messages via the FRI D channel to set up B channel 147 for the communication of data by terminal 112. Once this has been established, switching node 101 treats BRI remote station set 107 and terminal 112 as if they were directly connected to switching node 101.

An example of a communication path using the FRI link is the establishment of a call between BRI remote station set 107 and telephone 106. This communication path is from BRI remote station set 107 to switching node 101 via the FRI link, from switching node 101 to central office 160 via a B channel in PRI link 124, and from central office 160 to telephone 106 via telephone line 128. For such a call, central office 160 performs all the necessary signaling with respect to telephone 106 via telephone line 128; and switching node 101 performs all necessary signaling with respect to BRI remote terminal 107 via the FRI D channel.

Similarly, switching node 101 can communicate with central office 160 to establish a FRI link with remote telemarketing terminal 104. Switching node 101 performs the initial signaling to central office 160 over D channel 130, and central office 160 performs similar signaling with remote telemarketing terminal 104 over D channel 138 of BRI link 126. After establishment of a call, two B channels of PRI link 123 (illustratively channels 134 and 135) are interconnected via central office 160 to B channels 139 and 140, respectively, of BRI link 126. B channel 139 is a multiplex channel carrying the FRI D channel and a FRI B channel communicating the compressed voice. After establishment of this FRI link, remote telemarketing terminal 104 is handled in the same manner by the telemarketing application software in switching node 101 as local telemarketing terminals 109 through 110.

It should also be noted that BRI remote station set 107 or remote telemarketing terminal 104 can also similarly initiate the establishment of the FRI link with switching node 101 via central office 160.

There are no geographical restrictions on the locations of remote telemarketing terminal 104 or BRI remote station set 107. Indeed, they do not have to be located on the same continent. For a FRI link, there is no requirement that all the B channels within PRI link 123 (which are interconnected to the B channels of BRI link 129) be contiguously numbered since central office 160 performs the necessary switching operations. Indeed, it is unnecessary for the B channels to be within the same PRI link. For example, one B channel could be utilized from PRI link 123 and another from PRI link 124.

SOFTWARE ARCHITECTURE

Figure 2:
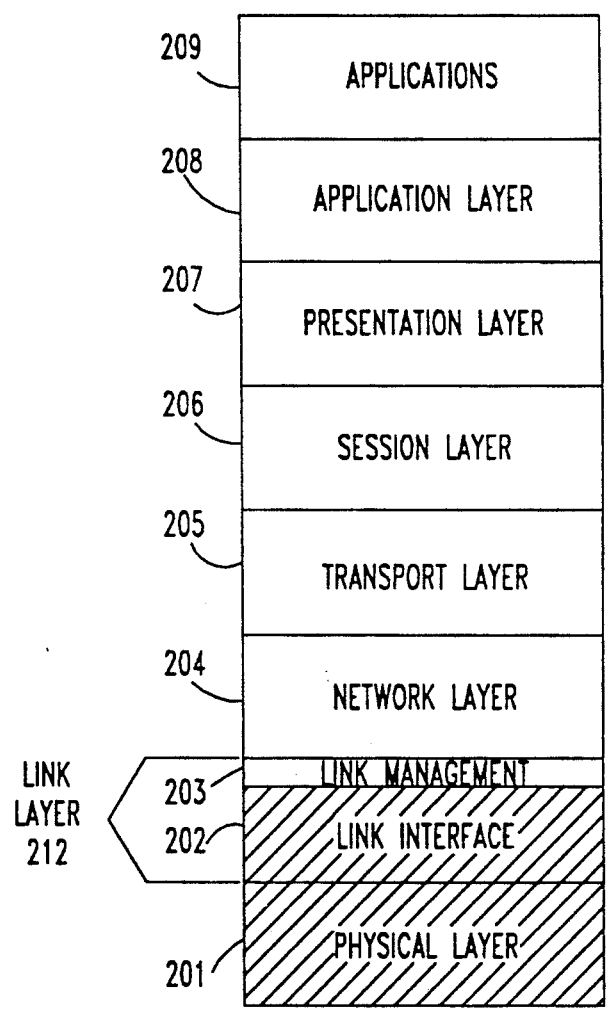
FIG. 2 illustrates a software architecture in accordance with the invention.

FIG. 2 illustrates the software architecture of the switching nodes and remote terminals of FIG. 1. This architecture is based on the conventional OSI model modified to implement the ISDN protocol. In accordance with the invention as described herein, certain further modifications have been made to the standard model in order to accomplish the expansion of ISDN capabilities to include the FRI capabilities of the invention. Looking ahead, it will be seen that encapsulated FRI D channel information communicated on a packetized subchannel of a B channel enters the software structure at a low software layer and is immediately communicated to the highest software layer, where the FRI D channel information is recovered and reinserted into an intermediate layer that processes all D channel information. By reinserting the FRI D channel information, the various functions controlling the FRI link can be carried out by higher software layers in a transparent manner that is the same as if those software layers were processing D channel information from a PRI or BRI link. Similarly, D channel information from those software layers for the FRI D channel is transferred from the intermediate software layer to the highest software layer which encapsulates it and communicates the encapsulated FRI D channel information to the low software layer for transmission on the packetized subchannel.

In order to lay the groundwork for these operations, it is useful to describe the various software layers of the software architecture.

The principal function of physical layer 201 is to terminate physical links. Specifically, physical layer 201 is responsible for maintaining physical channels and for controlling physical subchannels thereon. Physical layer 201 comprises a software portion and physical interfaces. Further, the software portion of physical layer 201 is responsible for the direct control of the physical interfaces to which physical links communicating PRI and BRI information terminate. Physical layer 201 presents to link layer 212 physical subchannels and physical channels as entities controllable by link layer 212.

The primary function of link layer 212 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 212 and physical layer 201. (An example of this type of protocol is the LAPD packet protocol used in ISDN Q.921. In the ISDN standard, link layer 212 terminates the LAPD protocol.) Link layer 212 can support multiple protocols so that the upper layers are uneffected by the different protocols being utilized. Further, link layer 212 allows higher software layers to control physical layer 201 in an abstract manner.

As seen in FIG. 2, link layer 212 is divided into link interface 202 and link management 203. The reason for this division is set forth herein below. It will be helpful at this point to discuss the communication of ISDN signals over a D channel to help readers, for example, who have only a rudimentary knowledge of the communication of ISDN signals over a D channel. At link layer 212, a plurality of logical links is established on a D channel. Only one of these logical links communicates ISDN control signals, and this logical link is referred to herein as a logical D channel (LDC). The LDC is identified by a logical D channel number (LDCN). In the previous example, it was the LDC of D channel 152 that switching node 101 used to control local telemarketing terminal 109. The other logical links within a D channel have other uses which are explained in connection with FIG. 4.

Link interface 202 does the majority of the functions performed by link layer 212, including the establishment of the logical links. Link management 203 identifies the various link interfaces for higher software layers. Further, link management communicates information between the logical links and higher software layers.

Network layer 204 processes information communicated on the LDCs, and thereby terminates the ISDN Q.931 protocol. Hence, this layer is responsible for negotiating the utilization of system resources for the termination or origination of calls external to a switching node or remote terminal. The network layer controls the allocation of channels on an interface on which a call is being received or set up. For example, if switching node 101 receives a call from central office 160 via PRI link 125, network layer 204 of switching node 101 negotiates with its peer layer (the corresponding network layer 204 in central office 160) in order to obtain allocation of a B channel in PRI link 125—a procedure later to be repeated if a second B channel is desired. This negotiation is carried out using standard ISDN Q.931 messages such as the call setup and connection messages via the LDC set up on the D channel of PRI link 125. Network layer 204 identifies all B channels of given interface with the LDC for that interface. Network layer 204 is only concerned with the establishment of a call from one point to another point (e.g., node to node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node or terminal.

Network layer 204 receives information from another node or terminal concerning a call via a LDC. As information is received on the LDC, a call reference number is utilized to identify the call associated with this message. The call reference number is selected by the originating network layer during call set up in accordance with the ISDN standard. Details of this identification are given with respect to FIG. 4.

Transport layer 205, is the key element that allows the routing of a call through a complex system having multiple nodes as illustrated in FIG. 1. Its primary function is to manage the routing of calls externally, i.e., between switching nodes. Transport layer 205 views the system of FIG. 1 in terms of nodes and is concerned with routing calls from its own node to other nodes or endpoints. (As explained in the detailed discussion of session layer 206, that layer, not transport layer 205, interprets logical destination information, such as a telephone number, to determine the destination node of a call and to establish an intra-node path by using the connection manager application.) In an overall system comprising multiple switching nodes such as switching node 101, the various transport layers communicate with each other in order to establish a call through the various switching nodes. This communication between transport layers is necessary because it may be necessary to route the call through intervening nodes to reach the destination node. The transport layers communicate among themselves utilizing signaling paths (LDCs) established between switching nodes.

With respect to inter-node routing, transport layer 205 is the first layer that starts to take a global view of the overall system illustrated in FIG. 1. Transport layer 205 uses information provided by session layer 206 to select the inter-node path. The transport layer performs its task of routing between various nodes by the utilization of tables defining the available paths and the options on those paths.

Communication between transport layers is done by network layer 204 using established LDCs. Transport layer 205 communicates information destined for its peers to network layer 204, and network layer 204 packages this information within the information elements, IEs, of standard ISDN Q.931 messages. Network layer 204 uses the LDC that has been set up to a particular node to communicate this information to its peer network layer. Similarly, when another network layer receives information of this type, the other network layer unpackages information and then directs the information to the transport layer.

The primary function of session layer 206 is to establish communication between endpoints with all endpoints considered to be applications including, for example, a BRI telephone. Significantly, in the present context these endpoints are applications such as the application performing the telemarketing features. In any event, connections between such endpoints is considered to be a call. A session is set up by session layer 206 any time two applications require communication with each other. As noted earlier, session layer 206 deals only in terms of switching nodes or terminals and applications on those switching nodes or terminals and relies on transport layer 205 to establish paths to other switching nodes. Session layer 206 identifies the called application by an address which previously in telecommunication was thought of as only a telephone number but has a much broader concept in the Q.931 protocol. From the address, session layer 206 determines the destination switching node. Session layer 206 sets up a call to the destination switching node by communicating with the session layer of the destination switching node. The communication with the other session layer is accomplished by having the session layer request its transport layer to place a call to the other switching node so that a connection can be made for a particular address. These requests are done using the network layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 207 of FIG. 2 invokes a complex protocol in order to groom the information being communicated between applications so that the applications are totally divorced from the protocol used to communicate the information. A presentation level protocol allows an application to communicate with a peer application across a transport path.

Finally, application layer 208 manages the resources needed by the applications running at layer 209. When an application at level 209 is communicating with another peer application, the application is unaware of how many other applications exist or where these other applications are located. It is the function of application layer 208 to determine and use such details, consequently allowing the applications to be written in a very abstract manner. At applications layer 209, thus far three applications have been discussed: telemarketing application, connection manager application, and the call processing application.

SOFTWARE ARCHITECTURE IMPLEMENTATION—OVERVIEW

Figure 3:
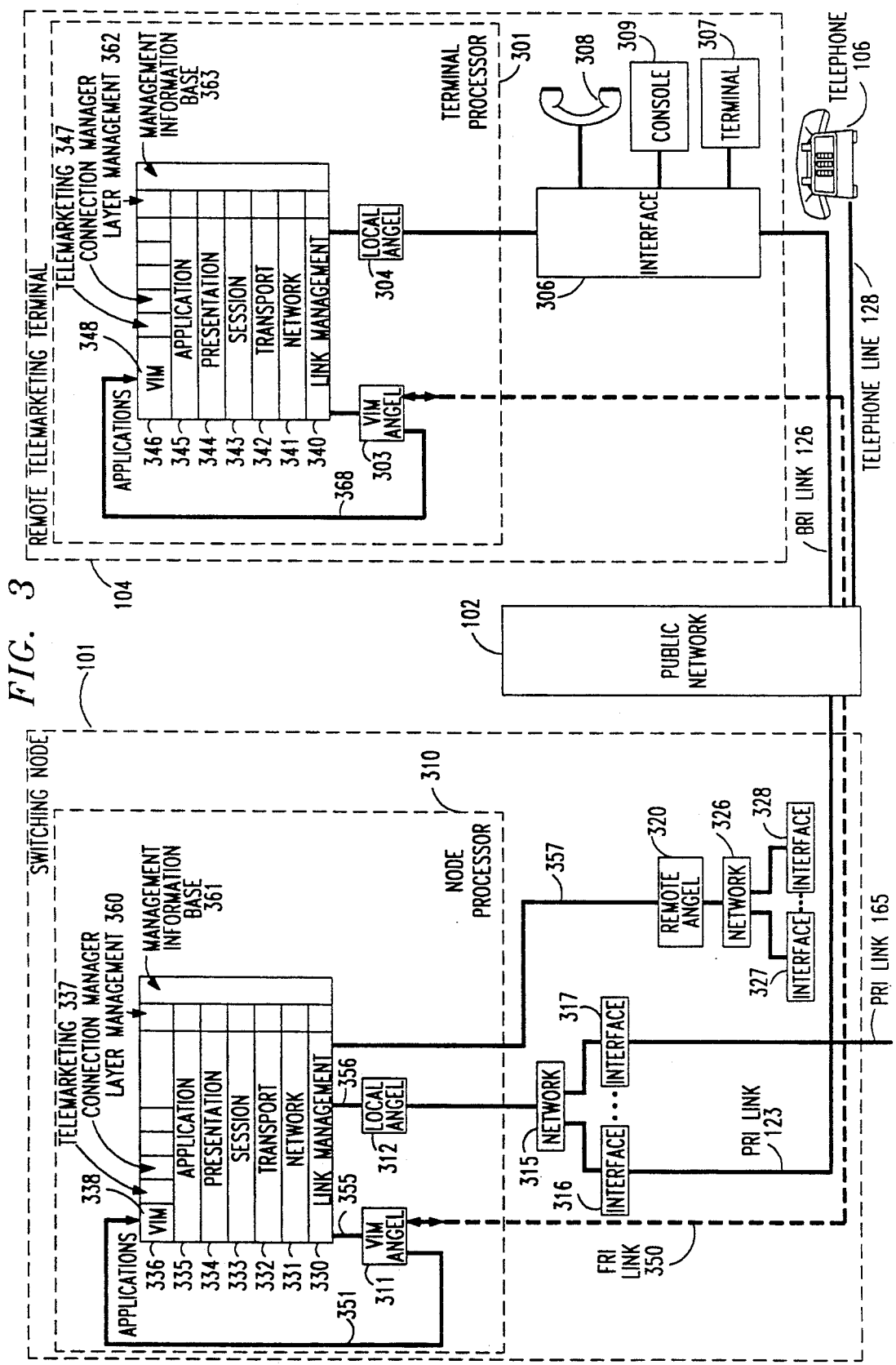
FIG. 3 illustrates, in block diagram form, the relationship between the software architecture and hardware elements illustrated in FIG. 1.

FIG. 3 illustrates in block diagram form the software architecture of FIG. 2 as implemented on switching node 101 and remote telemarketing terminal 104. This software architecture in accordance with the invention supports not only standard ISDN links but also FRI links. Software layers 203 through 209 are implemented on a main processor of each switching node and FRI-capable terminal, such as node processor 310 of switching node 101 and terminal processor 301 of terminal 104. Specifically, the software layers down through the link management portion of the link layer are realized by software layers denoted 336 through 330 in node processor 310 and software layers denoted 346 through 340 in terminal processor 301.

The link interface portion of the link layer is implemented by a number of separate software modules, each performing a link interface function. Each of these software modules is referred to as an "angel". These angels perform most of the functions of the link layer; and it is the task of the link management portion to simply provide a gateway, or interface, from the various angels to the upper layers of the software structure. The link interface in node processor 310 is implemented by local angel 312, Virtual Interface Manager (VIM) angel 311, and remote angel 320. Local angel 312 and VIM angel 311 are software modules executed by node processor 310. Remote angel 320 is a stand alone processor. The operation and purposes of remote angel 320 are described in detail in our copending U.S. patent application, Ser. No. 636,528, of B. M. Bales, et al. filed of even date herewith and entitled "Transparent Remoting of Switch Network Control over a Standard Interface Link". Correspondingly, the link interface in terminal processor 301 comprises local angel 304 and VIM angel 303.

The physical layer is jointly implemented by hardware and software. Specifically, the hardware portion of the physical layer for switching node 101 is implemented by interfaces 316 through 317 and interfaces 327 through 328. The software portion of the physical layer for interfaces 316 through 317 is performed by local angel 312 and for interfaces 327 through 328 by remote angel 320. For the FRI link, VIM angel 311 performs the software portion and simulates the hardware portion. Interfaces 316 through 317 and 327 through 328 are BRI and/or PRI interfaces of well-known types. Networks 315 and 328 perform the required switching functions under control of local angel 312 and remote angel 320, respectively.

In particular, interface 316 is associated with PRI link 123 and performs the physical subdividing of B channel 134 of FIG. 1 into its two subchannels. Although not explicitly indicated in FIG. 3, the voice subchannel (FRI B channel) is directly switched by network 315 through the switching node and out to, for example, telephone 106 via central office 102 along the lines described above. However, the packetized subchannel which communicates the FRI D channel is transferred by interface 316 via network 315 and local angel 312 to software layer 336 for further processing, as described in detail herein below.

At remote telemarketing terminal 104, the hardware functionality of the physical layer is carried out by interface 306. This end of the voice subchannel is directly switched by interface 306 to handset 308. Just as in the switching node, interface 306 transfers the packetized subchannel which communicates the FRI D channel via local angel 304 to software layer 346 for further processing.

Turning now, to an important feature of the invention—the manner in which the FRI capability is built into the system—it is first desirable to describe briefly, and in somewhat simplified detail, how signaling is established on a standard ISDN link and the problems of establishing signaling on a FRI link. After understanding the problems of establishing signaling on the FRI link, a brief description is given of how a standard ISDN link is initialized with respect to the software layers and then how the FRI link is initialized.

During the previous discussion of link interface layer 201 and physical layer 202, it was described how these two layers function together to establish logical links on packetized ISDN D or B channels. Link management software layer 203 identifies these logical links and communicates information to or from one of the logical links with any designated higher software layer. The designation of the high software layer occurs when the logical link is initialized. For example on a D channel of a standard ISDN link, one specific logical link (referred to as a logical D channel, LDC) is always designated to be communicated with network software layer 204 in accordance with the ISDN specification. The LDC communicates all call control information for the B channels of the standard ISDN link and is an integral part of the ISDN specification.

We come, now, to the crux of the problem. Since it is desired to have the network and higher layers process the data on the FRI D channel in just the same way that it process the data on any other D channel controlling associated B channels, one might think that this would be a simple matter of indicating during channel set up to local angel 312—which handles standard D channels—that a logical link of the packetized B subchannel is to be passed up through to the network layer for LDC processing. Things are not so simple, however, because the network and higher software layers perform all call processing based on the concept that all B channels of a ISDN link are controlled by the LDC of that link. These B channels are identified with the LDC during the initialization of the ISDN link well before the setup of the FRI link. For the network and higher software layers to later reassign B channels from the LDC of an existing ISDN link to the LDC of the FRI link would require a deviation from the ISDN standard with respect to the functions performed by software above link management 203. Further, this reassignment would require communication between two network layers which is another deviation from the ISDN specification. Further, such negotiations are not possible if there is an intervening switching system such as another switching node or public network 102. For example, those network layers could be in a switching node and an remote telemarketing terminal. The problem then is (1) to identify the FRI D and B channels of a FRI link to the network and higher software layers in the same manner as a standard ISDN link, (2) to correlate the FRI D and B channels with physical B channels communicating the FRI D and B channels oblivious to the network and higher software layers, and (3) to allow the network and higher software layers to control intranode switching of the FRI B channels in the same fashion as switching B channels of a standard ISDN link.

This problem is solved, in accordance with a feature of the invention, via use of the Virtual Interface Manager alluded to above. The Virtual Interface Manager, or VIM, is a software package which includes both link layer software and application software. The link layer software is, in fact the aforementioned VIM angel 312 in node processor 310 and its counterpart in terminal processor 340—VIM angel 303. (The link layer software was referred to earlier as the virtual link software module.) VIM angels 311 and 303 also simulate the physical layer. The application software is denoted in the FIG. 3 as VIM application 338 in node processor 310 and VIM application 348 in terminal processor 301. The general solution to the problem with specific reference to switching node 101 is as follows. During the setup of the physical B channels that communicate the FRI link, local angel 312 is instructed to communicate the FRI LDC information from a logical link of the packetized subchannel to VIM application 338. In response, local angel 312 performs the same type of operations as it does in communicating the LDC information from a standard ISDN link to network layer 331. In turn, VIM application 338 instructs VIM angel 311 to simulate a FRI link becoming active in order to inform the higher software layers that a new LDC has become active with a certain number of B channels. Once the FRI link has been identified to the higher software layers by the VIM angel 311, the FRI link is operational.

In operation, as FRI LDC information is received by VIM application 338 from the packetized B subchannel, VIM application 338 transfers this information to VIM angel 311. In response, VIM angel 311 transfers this information to link management layer 330 in the same manner as local angel 312 transfers information from a LDC of a standard ISDN link. When link management layer 330 receives LDC information for the FRI LDC, link management layer 330 transfers the information to VIM angel 311 in a conventional manner. In turn, VIM angel 311 transfers the information to VIM application 338. In response to the information, VIM application 338 communicates the information out on the packetized B subchannel.

When link management layer 330 receives information requesting that a control action be performed on one of the FRI B channels, this information is transferred to VIM angel 311 in the conventional manner which in turn transfers it to VIM application 338. VIM application 338 translates between the FRI B channel and the physical B channel that is actually communicating the FRI B channel and instructs the angel controlling the physical B channel to perform the requested control action.

To understand how a FRI link is initialized, first consider the initialization of a standard ISDN link. When a standard ISDN link becomes active, the physical layer identifies the physical interface terminating that link to the link interface software layer by a physical interface number. The link interface software layer establishes a packet protocol on the D channel and assumes that the LDC as being communicated by a pre-specified logical link of the D channel. The link interface software layer then informs the link management software layer that a new LDC is active, that it has a certain number of B channels, and that it is established on a certain interface. The link management software layer identifies this new LDC by its link interface software layer and informs the network software layer that a new LDC is active and that the LDC controls a certain number of B channels.

In response, the network software layer records the new LDC existence and sets up tables to control the B channels as they become active. In addition, the network software layer informs the transport software layer that a new LDC is active and to what system entity the new LDC is connected. After both sets of software layers (e.g. software layers 330 through 336 and software layers 340 through 346) are initialized in this manner, calls may be established over the B channels associated with the LDC by the network software layers. Signaling information received or transmitted on the LDC is communicated between the network software layer and the link management software layer. In turn, the link management software layer communicates this information with link interface software layer for communication on the logical link of the D channel.

Consider how a FRI link is initialized with respect to the software layers. Once such a FRI link is established between switching node 101 and remote telemarketing terminal 104, software layers 330 through 336 function as if FRI link 350 was a physical link and directly connected a portion of interface 306 (that portion controlling terminal 307, handset 308, and console 309) to VIM angel 311. Using the FRI LDC, software layers 330 through 336 control units 307, 308, and 309 in the same manner as if these units were directed connected to an interface attached to network 315.

The first step in the initialization process is for VIM application 338 to place a call to VIM application 348; this call establishes a B channel between the two applications. VIM application 338 then has the physical layer divide the B channel into two subchannels and requests that the link interface layer create a packetized channel on one of these subchannels. All information received or transmitted on this packetized channel is communicated between VIM application 338 and the link interface of angel 312 via link management layer 330. VIM application 348 performs similar operations. VIM application 338 then requests that another B channel be established between switching node 101 and remote telemarketing terminal 104.

In the second step, VIM application 338 requests that VIM angel 311 inform link management 330 that an LDC has become active and that it has two B channels. VIM angel 311 is implementing a FRI interface becoming active. (Herein, those channels are called FRI D and FRI B channels.) Recall that VIM angel 311 is performing the functions of the link interface software layer and simulating the physical layer. Software layers 330 through 336 process this information in the same manner as previously described for the standard link; hence, those software layers are unaware that a FRI link is different from a standard link. VIM application 338 maintains the correlation between the FRI channels and the physical channels that transport the FRI channels.

SOFTWARE ARCHITECTURE IMPLEMENTATION—DETAILED VIEW

The following paragraphs describe in greater detail the manner in which the FRI LDC and the two FRI B channels are established between switching node 101 and remote telemarketing terminal 104. VIM applications 338 and 348 perform one set of functions during the initialization of the FRI link and another set during normal operation of the FRI link. During initialization, VIM application 338 initiates and sets up the FRI link in conjunction with its peer VIM application, i.e., VIM application 348. Each node processor and terminal processor, in a system such as FIG. 1, has an administered telephone number used only for performing network setup functions. VIM application 338 uses the administered telephone number of terminal processor 301 to initially request that software layers 331 through 333 transmit a setup message with the telephone number in the calling party field. Also within an IE of codeset 6 of the setup message is the node number of node processor 310. By transmitting the setup message, VIM application 338 is placing a call to VIM application 348.

The setup message is transmitted in the LDC of the D channel of PRI link 123, which had previously been established when PRI link 123 was set up with central office 160. Central office 160 processes this request in a normal manner with respect to both switching node 101 and remote telemarketing terminal 104. The setup message requests a B channel, e.g., B channel 134 of FIG. 1 of the present example. After establishment of the FRI LDC on B channel 134, a second request is made for another B channel. Central office 160 communicates with remote telemarketing terminal 104 via the LDC of D channel 138 of BRI link 126. VIM 348 answers this call, and messages are transmitted back and forth as if a human being had answered the call on a conventional telephone set. Initially, the setup message is transferred to network layer 341. Network layer 431 transfers the setup message to session layer 343 via transport layer 342. When the setup message is received, session layer 343 handles this call in the same manner as it would any other call. Session layer 343 is responsive to the telephone number to determine that it is directed to VIM application 348 as an end point and transfers the setup message to application layer 345. Application layer 345 examines the dialed number in the called party number field and, based on that, transfers the call setup request to VIM application 348.

If VIM application 348 chooses to accept the call upon receipt of the call setup message, VIM application 348 transmits to the lower software layers a request that a B channel be established and that an acknowledgment message be sent. In response, network layer 341 formulates a connection message that is then transferred back to node 101 via central office 160. Network 341 also negotiates with central office 160 for the B channel, e.g., channel 139. Central office 160 is responsive to the connection message to interconnect B channel 134 to B channel 139, respectively. If VIM application 348 decides not to answer the message, then network layer 341 tears the call down by sending the proper messages to node processor 310 and central office 160.

After requesting the transmission of the connection message, VIM 348 transmits a request via link management 340. In response, link management 340 requests that local angel 304 control interface 306 so that interface 306 switches B channel 140 to terminal 307 and subdivides B channel 139 into two subchannels, One subchannel is utilized as a compressed voice subchannel, and the other subchannel is utilized as a packetized subchannel. Link management 340 establishes a mode 3 LAPD protocol on the subchannel to make it a packetized subchannel (also referred to as a logical link). A software path from the packetized subchannel is then interconnected through local angel 304 to link management 340. As described in greater detail with respect to FIG. 5, VIM application 348 then utilizes VIM angel 303 to inform software layers 340 through 346 that a FRI interface is being set up on VIM angel 303. Link management 340 is responsible to the virtual interface implemented by VIM angel 303 being set up to establish and to identify FRI link 350.

After setting up B channel 134, VIM 338 application requests that a second set up message be transmitted to interconnect B channel 135 to B channel 140 via central office 160. The resulting communication path becomes a FRI B channel.

In setting up the virtual interface implemented by VIM angel 303, VIM application 348 maps the physical channel number (angel interface number, sintf, and angel interface number, aintf) of interface 306 into the FRI channel number (aintf). In the present example, the packetized subchannel of B channel 134 becomes a FRI LDC which is illustratively assigned the number 24. B channel 135 is mapped into FRI channel 1, and the compressed voice subchannel of B channel 134 is mapped into FRI channel 2. Furthermore, link management 340 identifies the virtual interface on VIM angel 303 with a (sintf) and correlates this sintf with the VIM angel number and the aintf for the virtual interface. After this mapping and initialization of the physical interfaces is completed, the FRI link is established between switching node 101 and remote telemarketing terminal 104.

After the connection message is received back from remote telemarketing terminal 104, VIM angel 311 performs the same functions as local angel 312 performs when notifying software layers 330 through 335 that a new interface has been set up. In response to the connection message, VIM application 336 sets up a virtual interface using VIM angel 311 and transmits control information to local angel 304. In response to the control information, angel 304 initializes interface 316 so that B channel 134 becomes a multiplexed channel having packetized and compressed voice subchannels. In a manner similar to VIM application 348, VIM application 338 maps and identifies the virtual interface (utilizing internal tables) in order to establish the FRI link. Greater detail on setting up the FRI link is given with respect to FIG. 5.

After the VIM applications and VIM angels in both node processor 310 and terminal processor 301 have completed the execution of the previously described functions, the FRI link is established both from a hardware and software perspective between switching node 101 and remote telemarketing terminal 104. At this point in the present example, there is no actual voice or data call currently active on this link. The manner in which an active call is established on the FRI link is described in detail in the next paragraph.

At some point in time after the FRI link has been established between switching node 101 and remote telemarketing terminal 104, the agent utilizing terminal 104 becomes active. To become active, the agent at remote telemarketing terminal 104 first establishes a data connection for terminal 307 with a host computer (not shown in FIG. 3) attached to interface 317, using standard procedures for establishing a data connection. The signaling is done via the FRI LDC of FRI 350 link that is being transported by B channels 134 and 139. The data connection is transported on the first FRI B channel which is communicated on B channels 135 and 140 of PRI link 123 and BRI link 126, respectively. Layers 330 through 336 of node processor 310 are responsive to information communicated by angel 311 that a request is being made for a data connection between B channel 135 and the appropriate channel on interface 317 connected to the host computer. The software layers process this request in a normal manner and establish a connection via network 315. At this time, the agent is connected to the host computer but is not engaged in a voice conversation. However, handset 308 is interconnected to network 315 via interface 316 and the compressed voice subchannels on B channels 134 and 139.

In accordance with the present example, a customer using telephone 106 places a call to the telemarketing functions of switching node 101 via central office 160. This call is transported over a B channel of PRI link 123 of FIGS. 1 and 3. Telemarketing application 337, on the basis of internal algorithms, can use any agent assigned to local telemarketing terminals 109 through 110 or to remote telemarketing terminal 104 in exactly the same manner. In the present example, telemarketing application 337 selects the agent assigned to remote telemarketing terminal 104 to handle the call from telephone 106. To transfer the call from telephone 106 to remote telemarketing terminal 104, telemarketing application 337 transmits down to session layer 333 a request to interconnect the call being received from telephone 106 to the telephone number associated with headset 308. Session layer 333 translates the telephone number and searches the appropriate tables and finds that headset 308 is associated with a particular endpoint. This searching is done by utilizing information in management information base 361. Session 333 translates a telephone number to an endpoint, node, or public network. The fact that headset 308 is associated with an endpoint (the FRI LDC of FRI link 350) was established during the initialization of FRI link 350.

Session layer 333 transmits a request to transport layer 332 to determine the endpoint to which remote telemarketing terminal 104 is connected. Transport layer 332 determines that the endpoint is the FRI LDC. Transport layer 332 then transmits a request to network layer 331 to determine the sintf and channels of the FRI LDC. The channels associated with the FRI LDC can be determined by network layer 331, because network layer 331 associates with each LDC channel all the B channels for which each LDC provides signaling. Hence, by determining the LDC that is providing signaling for remote telemarketing terminal 104, transport layer 332 has also determined all the B channels that can be used to transport voice or data to remote telemarketing terminal 104. Network layer 331 responds to a request from transport layer 332 to select an available FRI B channel, which will be the compressed voice subchannel of B channel 335. Normally, network layer 331 determines a B channel for transporting the call from a plurality of channels that are part of a link; however, in the present example, only the second FRI B channel is left in the FRI link and that is the compressed voice subchannel which is identified to the network layer 331 as a regular B channel.

At this point, transport layer 332 identifies, in terms of the sintf, the physical channel used for telephone 106 and the virtual interface. Now, transport layer 332 requests through session layer 333 that the intra-nodal routing routine of connection manager application 351 establish a connection through switching node 101 to interconnect the interfaces for telephone 106 and remote telemarketing terminal 104. After establishment of that connection, remote telemarketing terminal 104 alerts the agent that there is an active call.

In order to set up a connection between the physical channels, transport layer 332 requests through session layer 333 that the intra-nodal routing routine of connection manager 351 determine the path through networks of switching node 101. The intra-nodal routing routine requests from VIM application 338 the mapping to establish that the voice channel of the virtual interface is terminated by physical interface 316 on a subchannel of B channel 135. The intra-nodal routing routine determines the physical interface and channel associated with the call from telephone 106 because this information was stored by session layer 333 in management information base 361 when this call was received. The communication between the intra-nodal routing routine and VIM application 338 is done at applications layer 336 and is not communicated through any of the lower layers. After determining the actual physical interface channel and the fact that both of the physical interface channels (which are on interfaces 316 and 317) are controlled by local angel 312, the intra-nodal routing routine transmits a command to local angel 312 to cause network 315 to interconnect the appropriate B channels. The commands to the local angel 312 from the intra-nodal routing routine are sent down directly and are not processed by layers 335 through 330.

How the agent is alerted depends on decisions made by telemarketing application 337. The agent can receive a zip tone in handset 308 which indicates that a customer is being transferred to the agent, or the agent can receive normal signaling which causes ringing at interface 306. During the alerting of the agent, all the physical resources within switching node 101 have been alerted and only the final connection within network 315 to B channel 335 needs to be made. When zip tone is used, the connection is continuously made to telephone handset 308, and terminal processor 301 is not involved with the utilization of the agent on remote telemarketing terminal 104 by telemarketing application 337 since all the work of terminal processor 301 had been previously performed. (Zip tone is used for the auto answer environment in telemarketing.)

Figure 4:
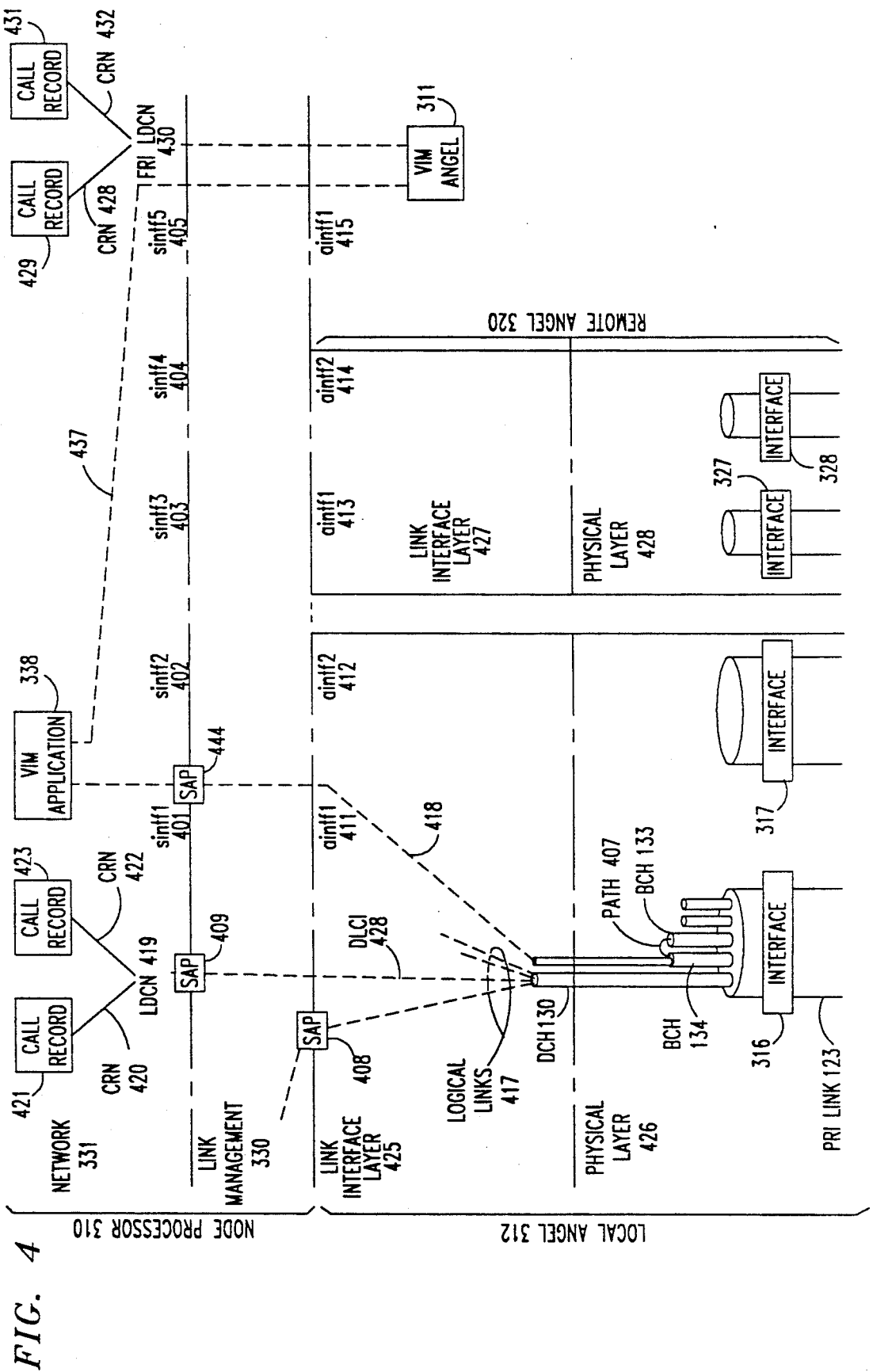
FIG. 4 logically illustrates the signaling and transport paths that are set up within a switching node.

FIG. 4 logically illustrates the general relationships between data link connection identifiers (DLCI), service access point identifiers (SAPI), terminal end identifiers (TEI), system interface numbers (sintf), angels, angel interface numbers (aintf), logical D channel numbers (LDCN), call reference numbers (CRN), and the various software layers. As illustrated in FIG. 4, each pair of link interface layers and physical layers is implemented on a different angel. Link interface layer 125 and physical layer 126 are implemented by local angel 312, and link interface layer 127 and physical layer 128 are implemented by remote angel 320. Node processor 310 implements link management layer 330, network layer 331, and higher layers. Sintf, angel and aintf numbers correlate to physical interfaces. The sintf numbers are utilized by network layer 331 and higher layers to identify physical interfaces. Network layer 331 identifies the physical interfaces by sintf1 401 through sintf4 404. The virtual interface implemented on VIM angel 311 is identified by sintf4 405. Link management 330 makes a conversion between the sintf numbers and the angel and aintf numbers which together represent the physical or virtual interface. For example, link management 330 converts sintf1 401 to local angel 312 and aintf1 411. Link interface layer 425 utilizes aintf1 411 to identify physical interface 316. There is a one for one correspondence between sintf1 401 through sintf6 405 and aintf1 411 through aintf2 415.

The sintf and aintf numbers identify specific interfaces, and each interface has a number of channels. For example, PRI link 123 has 24 channels. Network layer 331 identifies the channels associated with a particular sintf by using the actual physical channel numbers; and similarly, link interface layer 425 utilizes the physical channel numbers in association with an aintf number. The FRI channels are given channel numbers analogous to physical channel numbers. This numbering is possible because the specifications of the ISDN standard designate that physical channel 24 performs the signaling. Network layer 331 and higher layers utilize sintf numbers to control the link interface layers and physical layers to interconnect physical channels and to create specific protocols on these channels. The manner in which channels are interconnected through physical networks such as network 315 is not illustrated in FIG. 4 except in a logical manner, e.g. path 407.

Further, FIG. 4 logically illustrates the utilization of the various channels and endpoints at which these channels are terminated and at which information is utilized. As previously described, B channel 134 is subdivided at physical layer 426 of local angel 312 into two subchannels: a voice subchannel interconnected by path 407 to B channel 133 and a packetized subchannel. Path 407 is made through network 315. It would be obvious to one skilled in the art that similar paths could be made between B channels in interface 316 and 317. The circuit switching of B channels is performed at the physical layer; on the other hand, packet switching or frame relaying is performed at the link interface layer. The packetized subchannel of B channel 134 is terminated at link interface layer 425, which establishes a mode 3 protocol on this subchannel and communicates information with VIM application 336 via path 418. VIM application 336 communicates information with VIM angel 311 via path 427. Paths 418 and 427 are identified as path 351 in FIG. 3.

Figure 5:
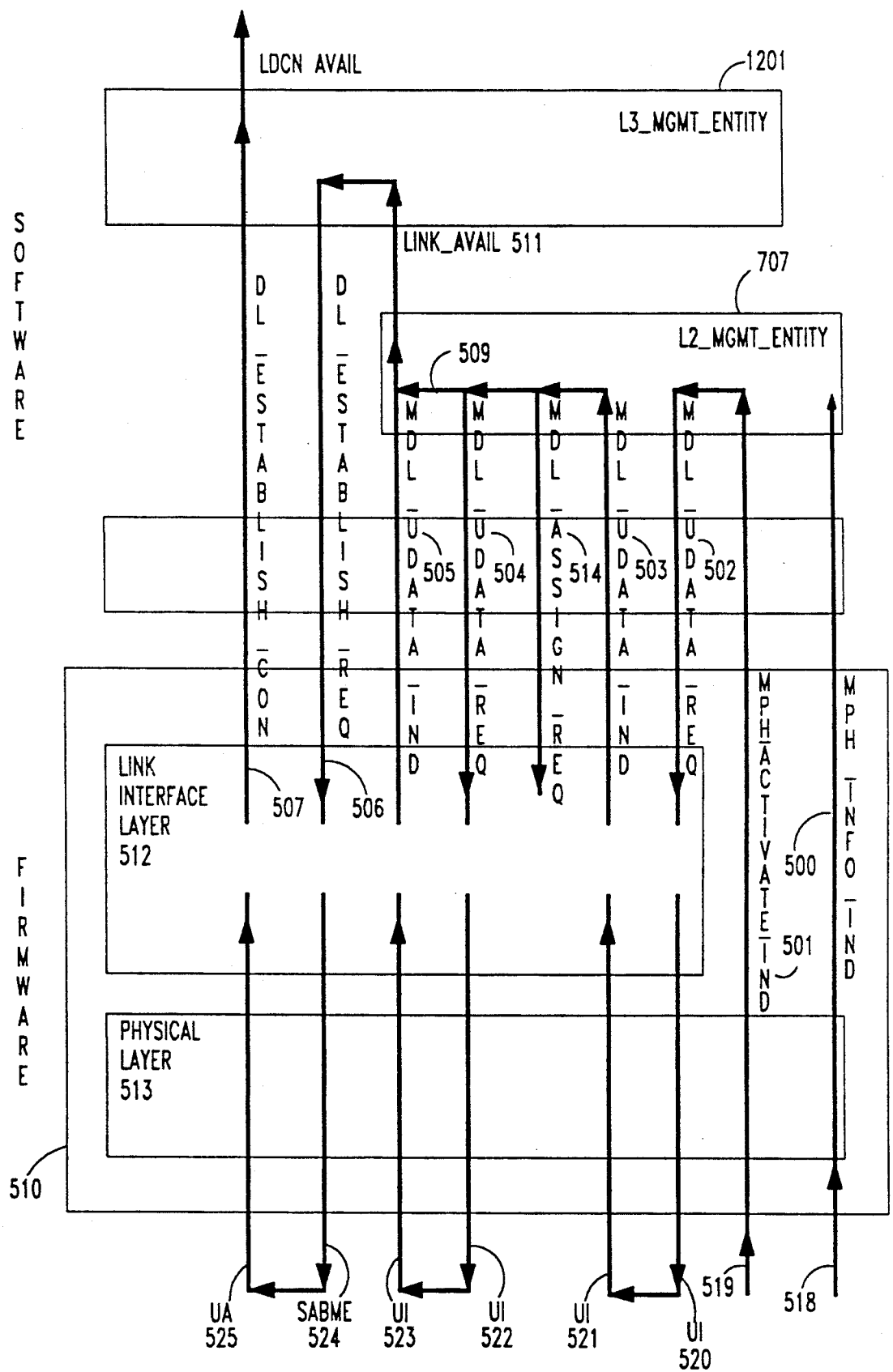
FIG. 5 logically illustrates a process for establishing a physical interface.

The manner in which an LDC is set up is described in great detail with respect to FIG. 5 and is not repeated at this point. However, FIG. 4 illustrates the manner in which D channel 130 is subdivided to provide the necessary flow of information to implement an LDC. At physical layer 426, all channels are treated alike. First, link interface layer 425 under control of a higher layer establishes a LAPD packet protocol on D channel 130, which is channel 24 of PRI link 123. The LAPD packet protocol creates a plurality of logical links 417, each of which is identified by a DLCI number such as DLCI 428. A DLCI number is based on the TEI and SAPI numbers. Each pair of TEI and SAPI numbers designates one DLCI or logical link. The protocol allows for 128 TEI numbers and 63 SAP numbers.

In accordance with the ISDN specification, a physical link can be considered either as point-to-point or point-to-multi-point. By convention, a PRI link may only be point-to-point resulting in only one TEI number being allowed on the D channel of a PRI link. Also by convention, that TEI number is equal to 0. A BRI link may be point-to-point or point-to-multi-point resulting in a D channel of BRI potentially having more than one TEI number. In accordance with the ISDN specification, four of the SAPI numbers of a D channel are predefined as 0 for call control, 16 for implementing an X.25 protocol, 1 for a packet mode connection, and 63 for peer to peer communication between link management layers. In FIG. 4, Service Access Point (SAP) 408 has the value of 63 and is used by link management 330 for communication with its peer in the present example on central office 160. SAP 409 has a value of 0 and is used to implement LDCN 419. In the present example, the SAPIs having values of 16 and 17 are not implemented. The remainder of the 60 SAPI values may be utilized to establish packet connections for the communication of data for software layers above network layer 331.

All signaling is controlled via LDCN 419 for interface 316. Upon receiving information with a SAPI of 0 which is SAP 409, link management 330 directs this information to network layer 331. In accordance with ISDN specification, call reference numbers are included in the Q.931 protocol and are received via LDCN 419. These call references numbers are utilized to identify call records such as call record 421 or 423. For example, CRNs 420 and 422 identify call records 421 and 423, respectively. There is one call record for each channel or subchannel that is engaged in a circuit switched or packetized call on a physical interface. Link management 330 utilizes sintfl 401 to associate LDCN 419 with call records 421 and 423. At network layer 331, CRN numbers are only unique with respect to an individual LDCN. Similarly, FRI link 350 is illustrated as having call records 429 and 431 identified by CRNs 428 and 432, respectively.

FIG. 5 illustrates the messages that are exchanged in bringing up an interface on switching node 101 of FIG. 3. The messages that are exchanged among the various levels for both VIM interfaces as well as physical interfaces are illustrated in FIG. 5. In the case of a physical interface, firmware 510, which includes link interface layer 512 and physical layer 513, is physically being implemented on either local angel 312 or remote angel 320. However, if the virtual interface is being brought up, firmware 510 is implemented by VIM angel 311.

First, consider FIG. 5 from the point of view of physical interface 316 of FIG. 3 which is being bought up. Initially as an interface port is plugged in (path 518), physical layer transmits the mph_info_ind 500 primitive which is directed to L2_MGMT_ENTITY 707 (a level 2 management entity which is described in detail with respect to FIG. 7). Note, the service access point (SAPI) number is a 63 for a MDL primitive and a zero for a DL primitive. Primitive 500 also includes the aintf which the angel selects. The aintf is the reference used by L2_MGMT_ENTITY 707 to refer to that interface. Primitive 500 also defines the type of interface, such as a PRI, BRI or FRI link, that has been brought up. Note, that the mnemonics indicate where the message is from and where it is going. MPH means that the message is between the physical layer and the level 2 management entity, MDL indicates that message is between the level 2 management entity and the LAPD part of link interface layer 512, and DL indicates that message is between level 3 and the LAPD portion of link interface layer 512.

When physical layer 513 detects framing (path 519) being received on the interface, physical layer 513 communicates this fact to entity 707 by the transmission of MPH_ACTIVATE_IND 501 primitive. To completely respond to primitive 501, entity 707 needs to establish with the other interface the terminal endpoint identifier (TEI). The TEI is determined through negotiations with the other interface. To accomplish this negotiation, entity 707 communicates with its peer level 2 management that is controlling the other interface. For example, assume that the indication on path 519 resulted from a BRI interface becoming active by a telephone being plugged into the BRI interface. Most BRI telephones are programmed to negotiate a TEI specified by the ISDN standard in response to Q.921 messages received via the BRI interface. If the active interface is not a BRI interface which supports the automatic TEI procedures, primitives 502 and 503 are not exchanged. Entity 707 starts the TEI negotiation by sending the MDL_UDATA_REQ 502 primitive that contains a TEI selected by entity 707 to layer 512. In response, layer 512 transmits UI 520 (unumbered frame). The peer entity responds to UI 520 via its interface with UI 521 that contains an indication of the peer entity's agreement with TEI selected by entity 707. In response to UI 521, link interface layer 512 inserts the indication into MDL_UDATA_IND 503 primitive. The CCITT specification allows for other commands at this point that allow for further negotiation of the TEI if entity 707 selected a TEI that was already being used by the telephone.

Entity 707 responds to primitive 503 by transmitting MDL_ASSIGN_REQ 714 primitive to link interface layer 512. This primitive contains information requesting that link interface layer 512 make an allowance for every possible SAPI that can be associated with the negotiated TEI. As explained with respect to FIG. 4, the SAPI defines how a logical link is being used; whereas, the TEI simply identifies a terminal on the other side. The request for link interface layer 512 to make allowance for SAPI makes provision for entity 707 to establish these SAPI at a later point.

Now, entity 707 transmits a MDL_UDATA_REQ 504 primitive whose information contains the address of a specific TEI and the node number of node 101. Primitive 504 is converted by layer 512 to UI 522. The reason for sending the node number using primitive 504 is to determine whether the other peer entity is on a switching node such as switching node 101. The other entity may also be on a public network or a BRI telephone. In response to UI 522, if the other entity is on a node, it responds with its node number by the transmission of UI 523 whose information includes the other entity's node number. Layer 512 responds to UI 523 by transmitting MDL_UDATA_IND 505 primitive. If the other entity is not a node, it fails to recognize UI 522 and does not respond, resulting in a time out. In response to the time out, entity 707 via path 509 communicates LINK_AVAIL 511 primitive to entity 1201 which is described in greater detail with respect to FIG. 11. At this point, entity 707 has accomplished the following functions: framing has been established, the TEI has been identified, link interface 512 has been advised to prepare for the establishment of different services via SAPI such as signaling, an attempt has been made to exchange node numbers, and the determination has been made that the interface is now ready to be used by higher layers. Entity 707 now advises entity 1201 via the LINK_AVAIL 511 primitive that the interface is now ready for use and whether or not the interface is a switching node.

Entity 1201 has to determine whether to establish a signaling link with the other entity. If entity 1201 already has a signaling link to the other peer entity in another switching node, entity 1201 does not precede with primitives 506 and 507. Entity 1201 has a signaling link with the other entity if the switching node of the other peer entity has an established interface with switching node 101. If entity 1201 needs to establish signaling, entity 1201 transmits a DL_ESTABLISH_REQUEST 506 primitive which contains information requesting that a signaling link (LDC) be established to the other entity. Layer 512 converts primitive 506 to SABME 524. If the other entity agrees, it transmits UA 525 back which layer 512 converts to DL_ES- TABLISH_CON 707 primitive. After receipt of primitive 507, entity 1101 transmits a LDCN_AVAIL message to transport layer 332 advising the transport layer that a new LDC has become available.

In forming the DL_ESTABLISH_REQUEST 506, entity 1201 uses the node number received in LINK_AVAIL 511 primitive to determine the position of the new node within the node system. Each node has a unique node number, and the number itself determines the position within the node system. In addition, this information is utilized to decide which entity is going to be the user or the network on a PRI interface. If this relationship is not correct on a PRI link, the link will not become operational. Before the transmission of DL_ESTABLISH_REQUEST 506, the signaling link has not yet been established so that the determination of user and network has not been made. Primitives 501 through 505 occur before any LAPD link is established. For this reason, all the frame commands are unnumbered. This frees the entities from having to determine the network and the user destinations. Before the transmission of primitive 506, entity 1201 compares the node numbers and from this comparison determines which of the entities will be defined the user or the network. For other entities such as the public network, this destination is specified. If the other entity is unknown with respect to being a network or a user, entity 1201 initially tries to come up as a user when transmitting out primitive 506. If this fails, entity 1201 determines this after a timeout period is exceeded. If a timeout occurred, entity 1201 then transmits out a second primitive 506 designating itself as the network.

The functions described with respect to FIG. 5 are now discussed specifically in relation to bringing up a FRI link between switching node 101 and remote telemarketing terminal 104. First, VIM applications 338 and 348 place a call between themselves. Using the LDC, VIM application 338 and VIM application 348 assign B channels as previously described. As previously described, VIM applications 338 and 348 exchange node numbers or absences of node numbers during call set up. Once the peer-to-peer communication has been established between VIM applications 338 and 348, these applications initialize their virtual interfaces in order to set up FRI link 350 and to identify these interfaces to the appropriate software layers. This is described from the point of view of VIM application 338 but VIM application 348 performs similar functions. In initializing the virtual interface to bring up FRI link 350, VIM application 338 must inform software layers 330 through 335 of the existence of the two B channels forming FRI link 350 and how the two B channels are being utilized. In addition, VIM application must set up a packetized data link on a subchannel of B channel 134. At this point, VIM application 338 has already set up two subchannels on B channel 134.

Figure 6:
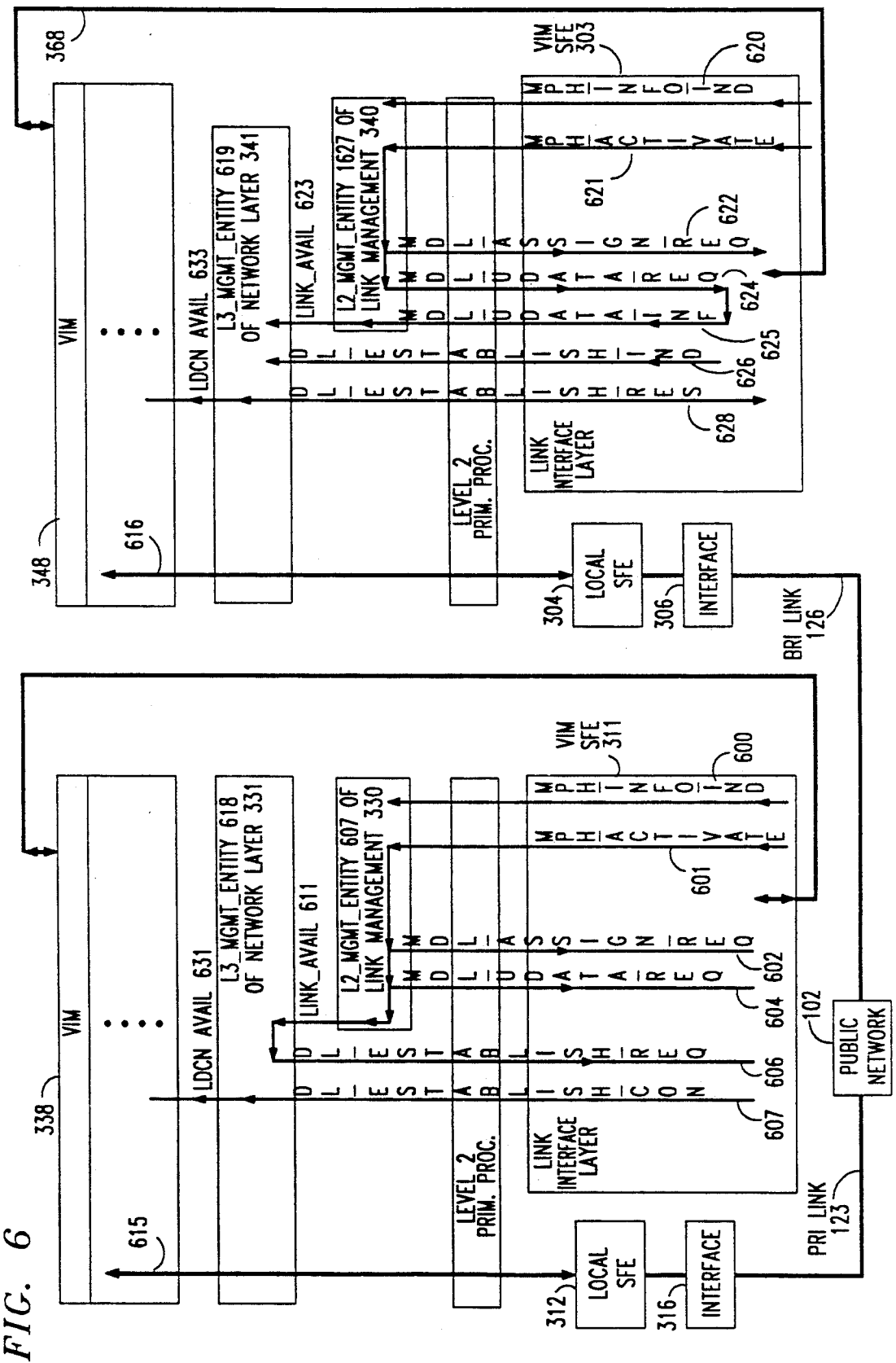
FIG. 6 logically illustrates a process for establishing a FRI link.

VIM application 338 now makes a correlation between a unique number which it assigns to the virtual interface and physical interface 316 that is used to communicate with remote telemarketing terminal 104. VIM application 338 causes VIM angel 311 via path 351 to transmit the MPH_INFO_IND 600 primitive to entity 607 of FIG. 6. Primitive 600 designates the virtual interface number, interface type (FRI), and the number of channels in the FRI. The three channels in the FRI are designated 1, 2, and 24 by primitive 600. This primitive informs entity 607 that a FRI link has just come up which is using FRI channel 24 and FRI B channels 1 and 2 of the FRI link. Entity 607 automatically assumes that FRI channel 24 is to be the D channel (actually it is a FRI D channel since it is handled by the VIM angel and the VIM application.) Next, VIM angel 311 transmits the MPH_ACTIVATE_IND 601 primitive indicating that it has framing. (Since the B channels have already been set up by VIM application 348, this can be done immediately.) VIM angel 303 performs similar functions by sending primitives 620 and 621.

Entity 607 now starts the standard procedure for establishing FRI LDC on FRI channel 24. Since the FRI interface is not a BRI interface, entities 607 and 627 do not have to establish a TEI number but assume a TEI equal to 0. Entities 607 and 627 do not have to exchange primitives similar to primitives 501 and 502 of FIG. 5.

In response to primitive 601, entity 607 transmits MDL_ASSIGN_REQ 602 primitive to VIM angel 311. VIM angel 311 is responsive to primitive 602 to transmit that primitive to VIM application 338. VIM application 338 transmits a message to local angel 312. In response to that message, local angel 312 assigns a TEI equal to 0 to a subchannel of B channel 139 of interface 316 and establishes a LAPD protocol on that subchannel. Entity 627 accomplishes the same task as performed by entity 607 by transmitting primitive 622.

Now, entity 607 initiates the exchange of node information by transmitting the MDL_UDATA_REQ 604 primitive. The latter is received by VIM angel 311 which responds with MDL_UDATA which contains information requesting the node number of remote telemarketing terminal 104. Since VIM angel 311 was informed during initial call setup that remote telemarketing terminal 104 was not a node, VIM angel 311 does not respond to primitive 604. Having received no response, entity 607 times out and transmits LINK_AVAIL 611 primitive.

Entity 627 transmits MDL_UDATA_REQ 624. Since switching node 101 has a node number, VIM angel 303 responds with that node number in MDL_UDATA_IND 625 primitive. In response, entity 627 transmits LINK_AVAIL 623 primitive.

In response to LINK_AVAIL 611 primitive, entity 618 transmits a DL_ESTABLISH_REQUEST primitive 606 to VIM angel 311 which transfers the primitive 606 to VIM application 338. VIM application 338 transmits primitive 606 down to local angel 311. In response to primitive 606, local angel 312 responds to primitive 606 from VIM application 338 to establish a LCDN on the subchannel in a manner similar as that described for primitive 506 of FIG. 5. A SABME primitive is transmitted on the packetized subchannel of channel 139 to local angel 304. The latter angel responds to the SABME by generating a DL_ESTABLISH_IND primitive and transmits that primitive to VIM angel 303 via VIM application 348 and path 368. VIM angel 303 is responsive to that primitive to transmit DL_ESTABLISH_IND 626 primitive to entity 619. In response to primitive 626, entity 619 transmits LDCN_AVAIL 633 primitive and a DL_ESTABLISH_RES 628 primitive. VIM angel 303 responds to primitive 628 by communicating that primitive to VIM application 348 which transmits that primitive to local angel 304. In response, local angel 304 establishes its end of the LDC and transmits a UA primitive to local angel 312.

In response to the UA primitive, local angel 312 establishes its end of the LDC and transmits a DL_ESTABLISH_CON 607 primitive to entity 618 via path 615, VIM application 338, path 351, and VIM angel 311.

Entity 618 responds to primitive 607 by transmitting the LDCN_AVAIL 631. At this point the FRI link is fully established with its own FRI LDC for signaling.

The LDCN_AVAIL message indicates the availability of another LDC and causes a higher level of initialization to take place. If the entity that has just become known to a node is a telephone, ISDN messages are exchanged in codeset 0 to obtain the service profile id (SPID) from the telephone or any other intelligent terminal. This information is transferred up to the applications layer where the terminal manager application uses this information to interpret button pushes. In addition, the SPID often contains the telephone number of the telephone. The terminal manager application negotiates with the telephone to assure that the telephone does not have a duplicate SPID and that the SPID is in a numbering plan of session layer 333.

Figure 7:
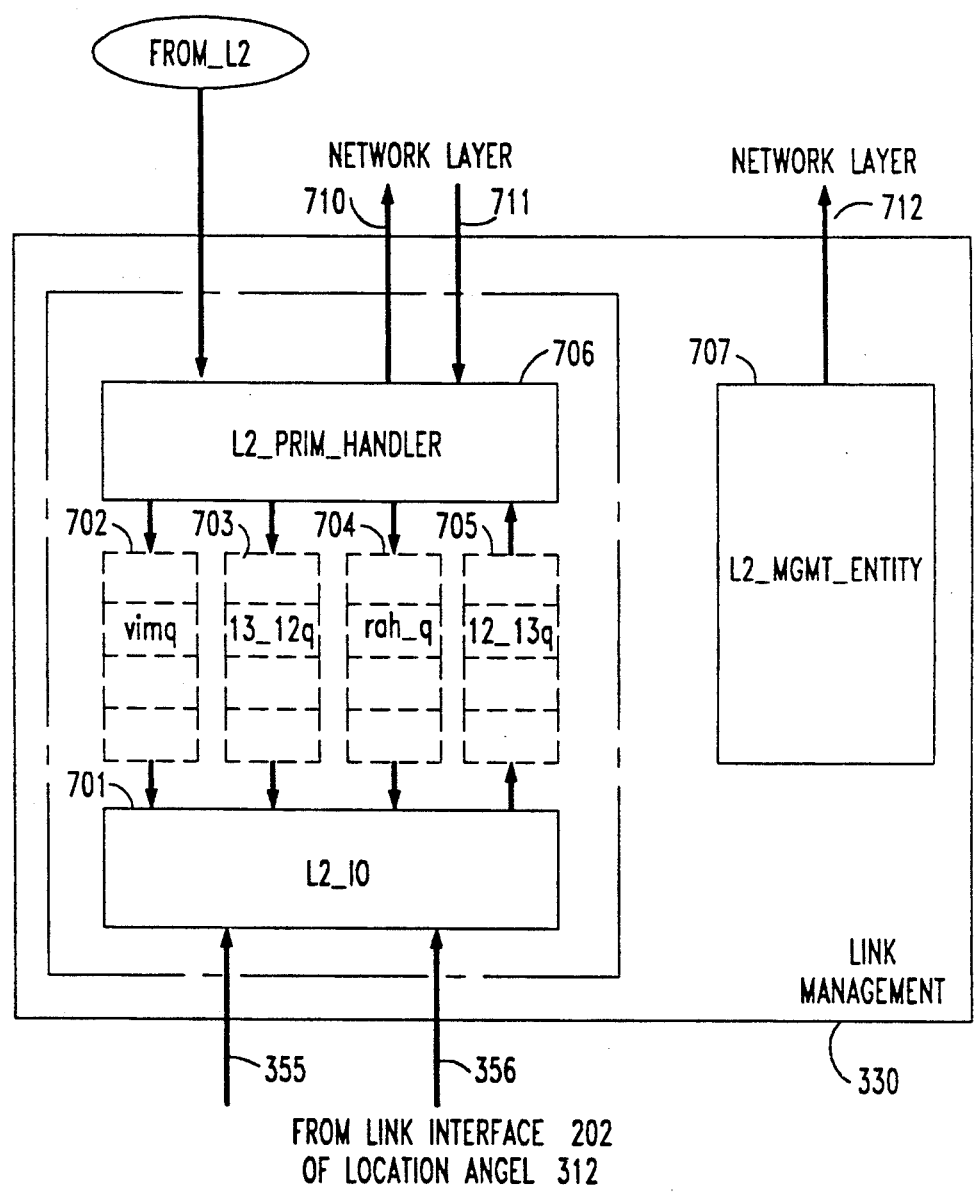
FIG. 7 illustrates a software architecture for a link interface.

Link management 330 is shown in greater detail in FIG. 7. Link management 330 consists of blocks 701, 706, and 707 and queues 702 through 705. Using queues 702 through 705, L2_IO 701 communicates data with link interfaces similar to link interface 202. L2_PRIM_HANDLER 706 is concerned with receiving and placing information into queues 702 through 704 from network layer 331. Block 706 also makes the determination of whether information should be transferred to network layer 331 or to L2_MGMT_ENTITY 707. In addition, block 706 performs the mapping between the sintf number and the angel and aintf number. L2_MGMT_ENTITY 707 is concerned with performing the functions of layer management 210 at the link management level.

Figure 8:
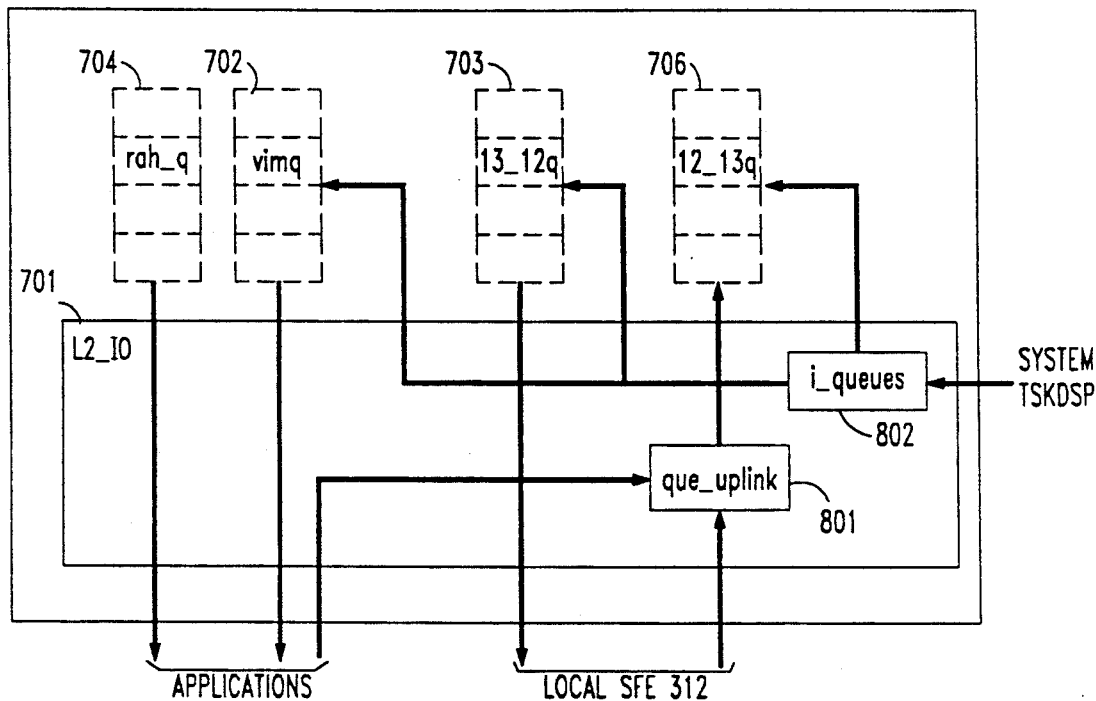
FIGS. 8 through 10 illustrate, in greater detail, the software architecture for a link interface.

L2_IO 701 is illustrated in greater detail in FIG. 8. Que_uplink 801 transfers information received either from the VIM angel or remote angel or local angel 312 into 12_13q 705.

The remote angel handles the L2-L3 function, the communication handler function, and the layer management which are running in the remote angel. Greater detail on the operation of the remote angel is given in the previously referenced copending application. Information flows directly from queues 702 through 704 to either the applications or the local angel. The queues are initialized by i_queues 802 under control of the system task dispenser. Blocks 801 and 802 are subroutines which are called by the appropriate entities.

Figure 9:
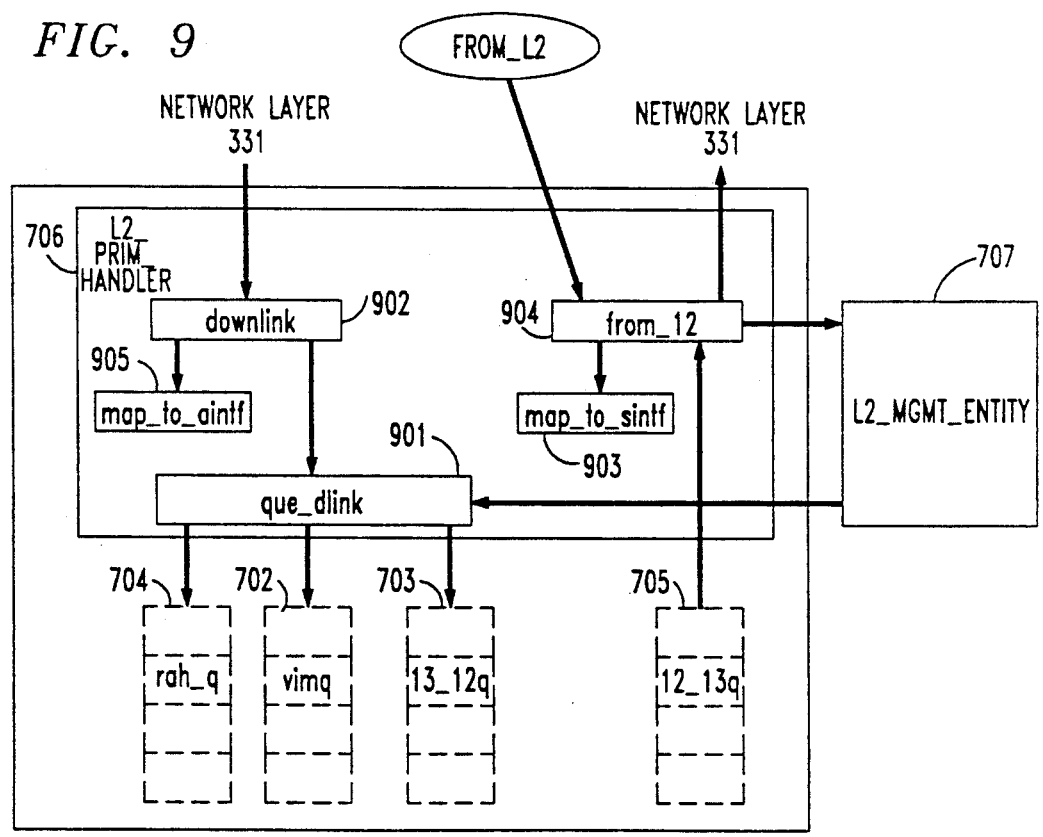

L2_prim_handler 706 is illustrated in greater detail in FIG. 9. With respect to data received from the different angels, block 706 determines whether this information should be transferred to network layer 331 or L2_MGMT_ENTITY 707. This function is performed by from_12 904 which reads the primitives contained in queue 705. Note that block 904 is periodically invoked by the system task dispenser to remove primitives from queue 705 (this is indicated by oval 906). Block 904 makes the decision of where to transfer the primitives stored in queue 705 by examining these primitives. If the primitive starts with a DL mnemonic, the primitive is to be transferred to network layer 331; if the primitive starts with a mnemonic of MDL or MPH, the primitive is to be transferred to L2_MGMT_ENTITY 707. The primitives transferred to or from L2_MGMT_ENTITY 707 are in three general classes. The first of these classes is information concerning the physical status of links in switching node 101. The second class is signaling being received from another link management layer in another node. An example of the second class is the signaling that occurs between remote telemarketing terminal 104 and switching node 101 as described with respect to FIG. 5. With respect to second class, the overall function provided by 12_MGMT_ENTITY 707 is to negotiate with its corresponding peer to establish node numbers and to bring up an interface. The third class is the control of the interfaces within switching node 101.

Returning to FIG. 9, if from_12 904 determines that the primitive is not to be transferred to block 707 of FIG. 9, block 904 maps the angel and aintf numbers to the sintf number by invoking map to sintf 903. After obtaining the sintf, from_12 904 transfers the primitive to the network layer 331. Messages coming from network layer 331 are first processed by downlink 902 which invokes map_to_aintf 905. The latter subroutine converts the sintf number to the angel and the aintf numbers. Once the angel and aintf numbers have been obtained, downlink 902 invokes que_dlink 901. Also, downlink 902 converts the message protocol received from network layer 331 into an intra-link level protocol resulting in primitive. Subroutine 901 then places the primitive in queues 702, 703, or 702 based on the angel number.

Figure 10:
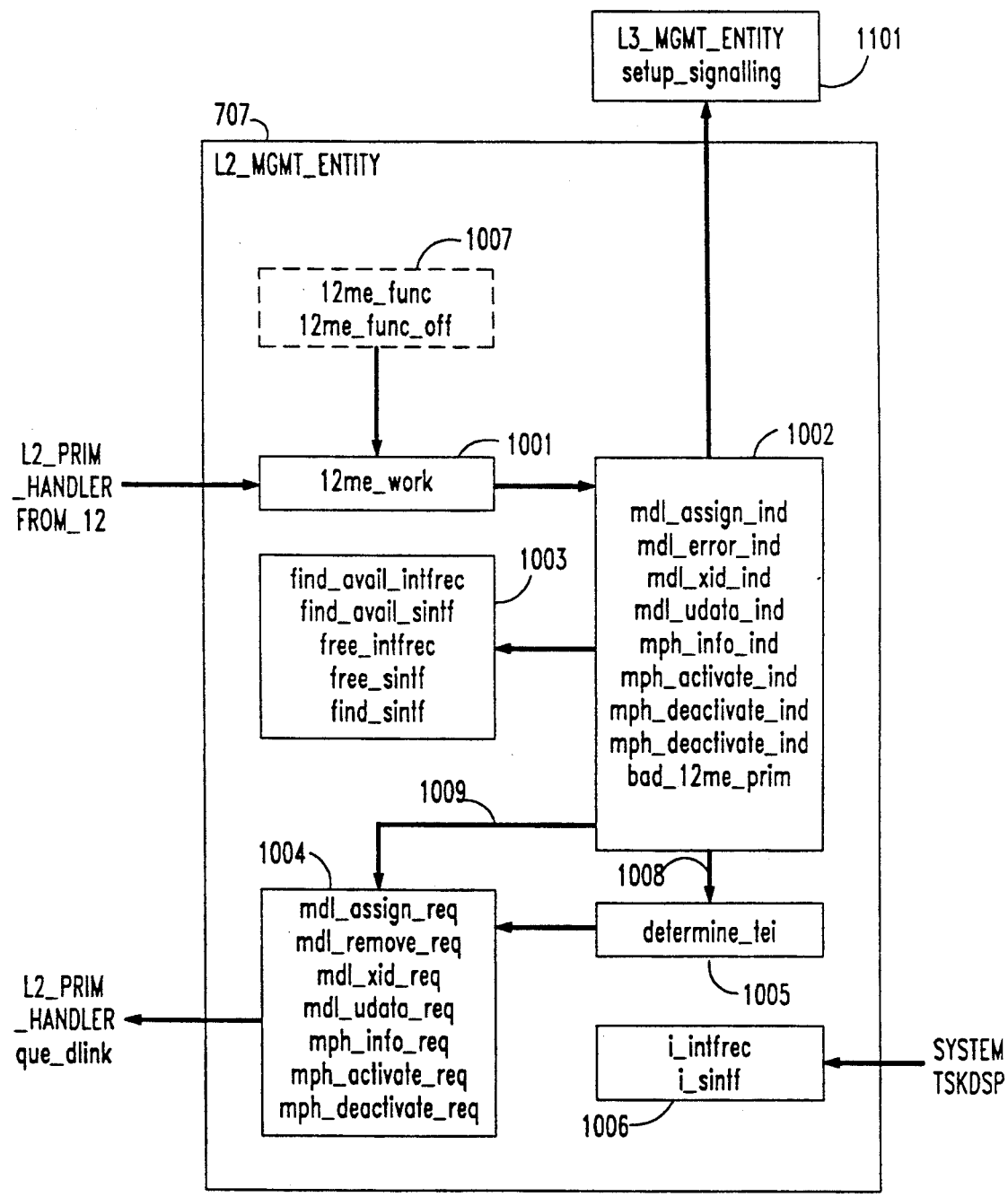

Now consider information which is being received by que_dlink 901 from L2_MGMT_ENTITY 707 as illustrated in FIG. 9. In explanation of the type of information that is being transferred from block 707 to subroutine 901, reference is now made to FIG. 10. During initialization of an interface, block 1001 activates certain subroutines in block 1002. Once activated, these subroutines activate other subroutines in block 1004. The subroutines in block 1004 transmit messages to the physical or virtual interface being initialized. Examples of subroutines in block 1002 activated by messages from an interface to transmit messages back to the link interface via block 1004 is given with respect to FIG. 5. For example, when node numbers are to be exchanged, subroutine MDL_UDATA_IND of block 1002 is activated which in turn activates subroutine MDL_UDATA_REQUEST of block 1004. In addition, the subroutines of block 1002 utilize the subroutines of block 1003 to find sintf and intfrec numbers. L2_MGMT_ENTITY 707 assigns the sintf numbers when a new interface is established and allocates memory for the interface within management information base 211. In addition, entity 707 frees sintf numbers when an interface is discontinued. The functions of entity 707 are performed in conjunction by subroutines in blocks 1002 and 1003 of FIG. 10. Block 1006 is utilized by the system task dispenser to initialize the intfrec and sintf numbers. In addition, some of the subroutines in block 1002 can transmit information up to the 13 management entity (L3_MGMT_ENTITY 1101 shown in FIG. 11)

Figure 11:
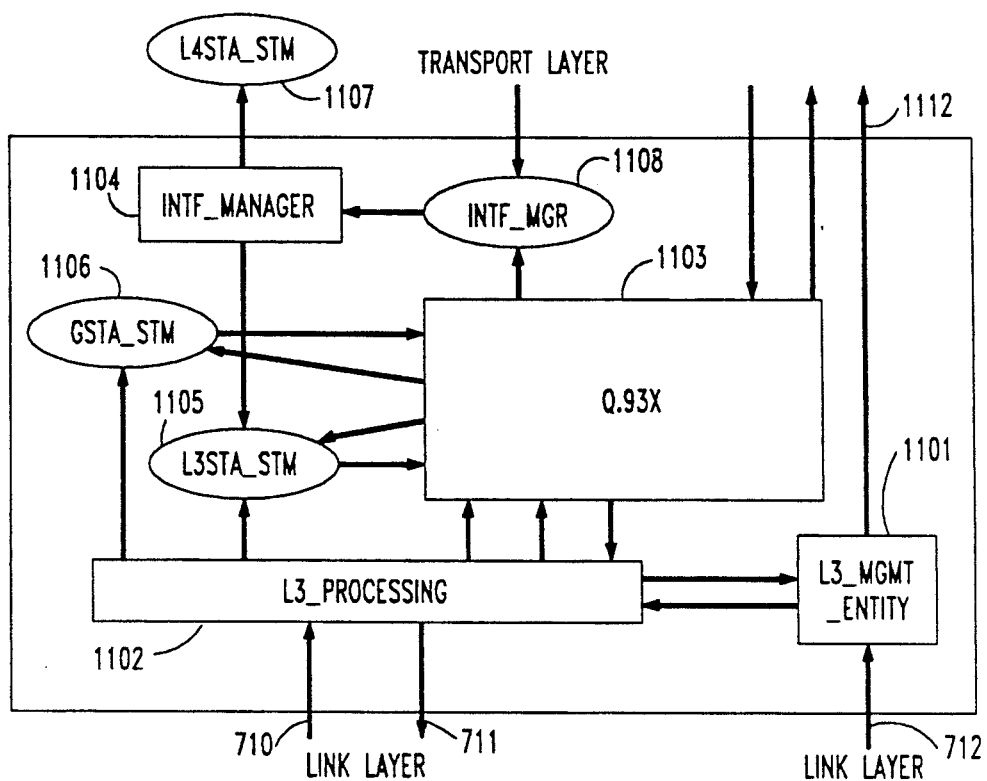
FIGS. 11 and 12 illustrate, in greater detail, a software architecture for a network layer.

FIG. 11 illustrates a detailed block diagram of network layer 204. There are two paths flowing between layers. One is a signaling path which is designated as paths 710 and 711, and the other one is a management information path which allows management entities to communicate and is designated as paths 712 and 1112. An example of management information stored in the management information base 211 is the sintf number which is inserted by entity 707, but the sintf is also used by different management entities in higher layers. Another example is the framing indication for an interface which is placed in the management information base 211 by entity 707. The management entity of the transport layer utilizes this framing indication to determine whether or not it has a transport connection to a particular node.

In FIG. 11, L3_PROCESSING 1102 is responsible for communicating signaling information to and from link management 330. L3_MGMT_ENTITY 1101 is responsible for establishing and removing signaling paths which are used for connections. For example, block 1101 initially transmits the setup message to initiate the setting up of a call. This message is transferred down to link management 330 for transmission. Q.931 block 1103 is responsible for all protocol handling. INTF_MANAGER 1104 is responsible for interfacing with transport layer 332.

Figure 12:
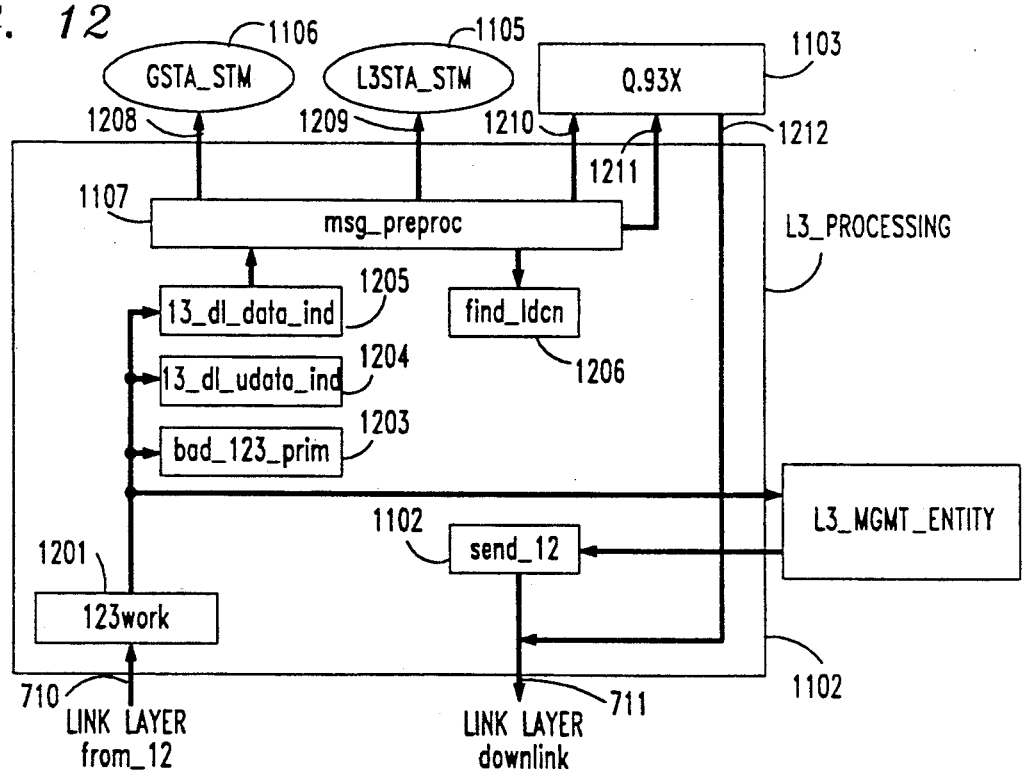

L3_PROCESSING 1102 is illustrated in greater detail in FIG. 12. Note that with respect to bringing up a VIM interface, L3_MGMT_ENTITY 1101 considers a VIM interface as a physical entity when it is setting up a FRI LDC, since the VIM application and VIM angel are capturing set up information from block 1101 and then retransmitting this information down the software layers. This information is actual transmitted on the packet data subchannel of the physical B channel used for the FRI LDC. As information is received from link management 330, 123work 1201 decides whether the messages should be transferred to L3_MGMT_ENTITY 1101 or to subroutines 1203 through 1205. Subroutine 1203 processes primitives from the link layer which are not recognizable and simply records the fact that such a message has been received. Block 1204 can be used to receive the DL_UDATA_IND primitive. L3_dl_data_ind 1205 handles actual signaling messages when called from 123work 1201. Subroutine 1205 handles the Q.931 messages and transfers these to msg_preproc 1207. Subroutine 1207 does some of the initial Q.931 verification of the message. These functions include assuring that the protocol discriminator specifies one of the Q.931 protocols, checking the call reference value, and checking the message type to assure that it is a valid message type. The call reference value is checked for being a valid value and whether it refers to a currently active call or a new call for which resources are available within switching node 101 to handle.

Msg_preproc 1207 either transfers the message to Q.931 block 1103 or to one of the state machines, GSTA_STM 1106 or 13STA_STM 1105 of FIG. 11. If the message is a global message, it is passed to state machine GSTA_STM 1106. (A global message is one that effects every call on an entire interface, such as a reset on a PRI link.) State machines 1105 and 1106 take care of particular types of messages and utilize block 1103 to process these messages. If the call reference value indicates a regular message, state machine 1105 is called. If the call reference value is null, then block 1102 passes this message directly to block 1103, since no state processing is required. In addition, if block 1207 of FIG. 12 determines that it has received an incorrect message, it transfers a message up to block 1103 of FIG. 11 requesting the transmission of a Q.931 message back to the other side informing the other side that an invalid message was received. (An example of an invalid message is an invalid protocol discriminator.) When msg_preproc 1207 is processing the message from link management, it utilizes find_ldcn 1206 to determine the translation between the sintf number and the LDCN. The LDCN is used to identify messages to the entities above L3_PROCESSING 1102. During the establishment of signaling by L3_MGMT_ENTITY 1101, block 1101 defines the correspondence between the LDCN and sintf number. The output of Q.931 1103 flows directly through block 1102 since block 1103 has formatted the message for link management 330. However, messages from L3_MGMT_ENTITY 1101 must first be formatted by subroutine send_12 1202 before being transferred to link management 330. Note, when L3_MGMT_ENTITY 1101 selects the LDCN, block 1101 reports this number up to the management entity at the transport level via path 1112.

Consider elements 1103 through 1108 of FIG. 11. GSTA_STM 1106, 13STA_STM 1105, and 14STA_STM 1107 represent information being placed into state queues for execution by the system task dispenser. For example, when L3_PROCESSING 1102 receives a global call reference value, it places information into the queue for GSTA_STM 1106 which results in the system task dispenser initializing the global state machine resulting in a call to block 1103. Task 1105 handles messages which have a specific call reference value and initiates, under control of the system task dispenser, the appropriate routines within block 1103.

Block 1103 is responsible for performing all of the Q.931 protocol handling. The functions performed by block 1103 in processing the Q.931 protocol are clearly defined in the CCITT Blue Book specifications. Ovals 1105 and 1106 represent the execution of a task by the system task dispenser. These tasks handle particular types of call reference values and perform their work by calling specific parts of block 1103; whereas the tasks represented by ovals 1105 and 1106 are not directly specified by the ISDN specifications their functions are. The purpose of showing a task being initiated out of the ovals is to indicate that the system task dispenser controls the initialization of these tasks. For example, oval 1108 represents the request that block 1104 be executed when information is put into a queue of the system task dispenser indicating that block 1104 should be executed.

Block 1104 serves as an interface to transport layer 205 and processes messages coming down from the transport layer 205 either to convert these messages into signaling messages to be processed by block 1103 via oval 1105 or to handle request for facilities or transport capabilities from the higher levels. The primary job of INTF_MANAGER 1104 is the management of facility and transport for a particular interface. In order to do this, block 1104 is responsible for handling the initial set up of calls, e.g., the call request and negotiating the number of channels necessary for each call. In order to perform this function, block 1104 is aware of the number of B channels associated with each LDC and chooses a particular B channel or channels to be used for a call. It is not the responsibility of block 1104 to determine a path through a switching node such as switching node 101 or a path through multiple switching nodes. Transport layer 205 has the responsibility for finding that type of a path as is described in a later section. Block 1104 determines by negotiation which B channels are used for a particular call. This negotiation is carried out with another corresponding entity in the other system element also attempting to set up that call, e.g., remote telemarketing terminal 104 of FIG. 3.

During the set up of a call originated by an individual telephone, block 1104 initially negotiates with the telephone concerning which B channel is utilized to transport the voice information and handles the signaling involved in the Q.931 protocol. In addition, interface manager 1104 sends the appropriate commands down to the link and physical layers to cause the interface itself to be appropriately set up.

As the call progresses, transport layer 332 determines where the call is going to and sets up the internal switching within the node 101. Transport layer 332 uses the intra-nodal routing routine to accomplish this function. After the transport has been arranged through node 101, transport layer 332 invokes block 1104 via oval 1108 to negotiate the setup of the call on the outgoing interface of node 101. Block 1104 performs this in a similar manner to the negotiation of the original setup request from the originating telephone. In summary, block 1104 is responsible for the selection by negotiation which B channels are used from a particular system interface for a call.

To better understand the functions of the blocks illustrated in FIG. 11, consider the following detailed example concerning the setting up of a call to switching node 101. Initially, there would be a request (DL_DATA_IND) primitive coming up from link management 330. L3_PROCESSING 1102 is responsive to this primitive to check the existence of a specific call reference value and to check the protocol. Block 1102 then places into the queue for 13STA_STM 1105 the fact that a message has been received. Under control of the system task dispenser, oval 1105 initiates the execution of block 1103 to do the protocol processing on the received message to assure, for example, that the message is of the correct state. Block 1103 then indicates to the system task dispenser via oval 1108 that there is a call request and that block 1104 should be executed. Block 1104 then verifies that there is a B channel available on the requested interface to handle this call and sends back a call proceeding request via oval 1105. Under control of the system task dispenser, oval 1105 initiates block 1103 to generate the call proceeding message back to network layer 204 in the originating telephone. In addition, block 1104 initiates transport layer 332 via oval 1107 to determine that the required resources exist within node 101 to complete the call. The required resources may be limited to those of switching node 101 or may require resources in other nodes in order reach the destination node. It is the responsibility of transport layer 332 to determine whether the destination node can be reached. Note, when block 1103 is invoked to transmit the call proceeding message, block 1103 first checks to make sure that the transmission of the call proceeding message was correct for this stage of the call and forms and sends the call proceeding message to L3_PROCESSING 1102. Block 1102 forms this message into a dl_data_req primitive which is transmitted to link management 330.

During the processing of the information by transport layer 332, if layer 332 has no information for routing to the destination node, layer 332 with session layer 333 determines the path to the destination node. Session layer 333 determines which node the call is destined for by evaluating the dial digits. Once session layer 333 has picked the node, transport layer 332 is responsible for determining how to get to that node. After determining how to route the call, transport layer 332 sets up a call to the destination node. In order to set up the call to the other node, transport layer 332 invokes INT-F_MANAGER 1104 via oval 1108. Block 1104 selects an interface that is controlled by the LDC and connected to the destination node, and block 1104 then selects a B channel on that interface. After accomplishing this selection, block 1104 negotiates the set up of the call with the other node. In order to negotiate the set up of the call, block 1104 invokes the state machine associated with oval 1105 to have the proper message generated by block 1103 for transmission to the destination node. Block 1104 also selects the call reference value to be utilized on the LDC. Block 1103 verifies that the message can be transmitted (a setup message) and formulates this message and transfers it to L3_PROCESSING block 1102.

The information on paths 1113 and 1114 comprises messages that were received that had a null call reference value. These messages fall into two general categories. The first category is messages which are being transported back and forth between layers 333 through 336 with their equivalent peers in another node. The second category of messages is those messages that are not call related. For example, the button pushes on a station set are not call related and are transmitted from the station set to the node with a null call reference value.

Figure 13:
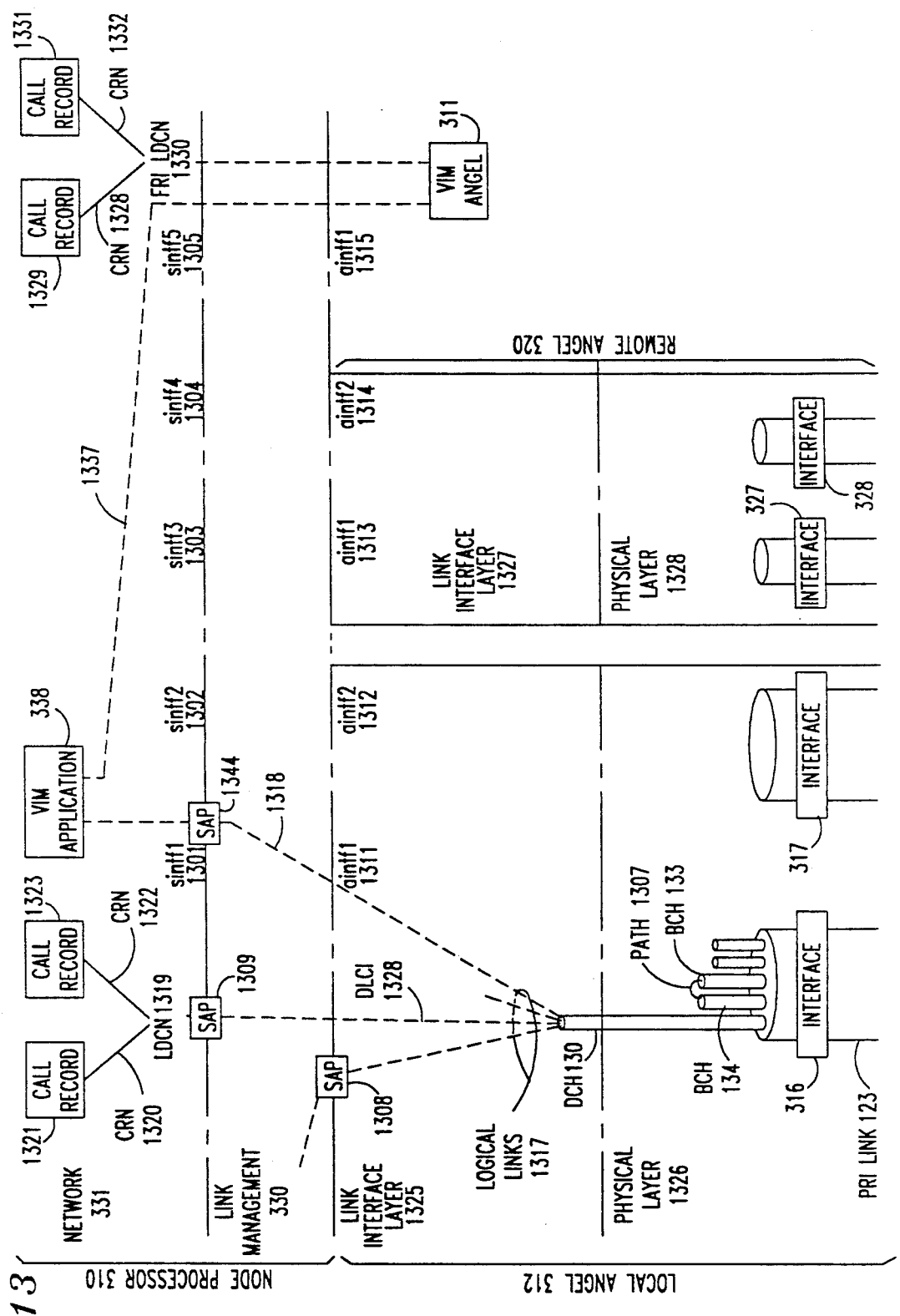
FIGS. 13 and 14 illustrate other embodiments of the invention.
Figure 14:
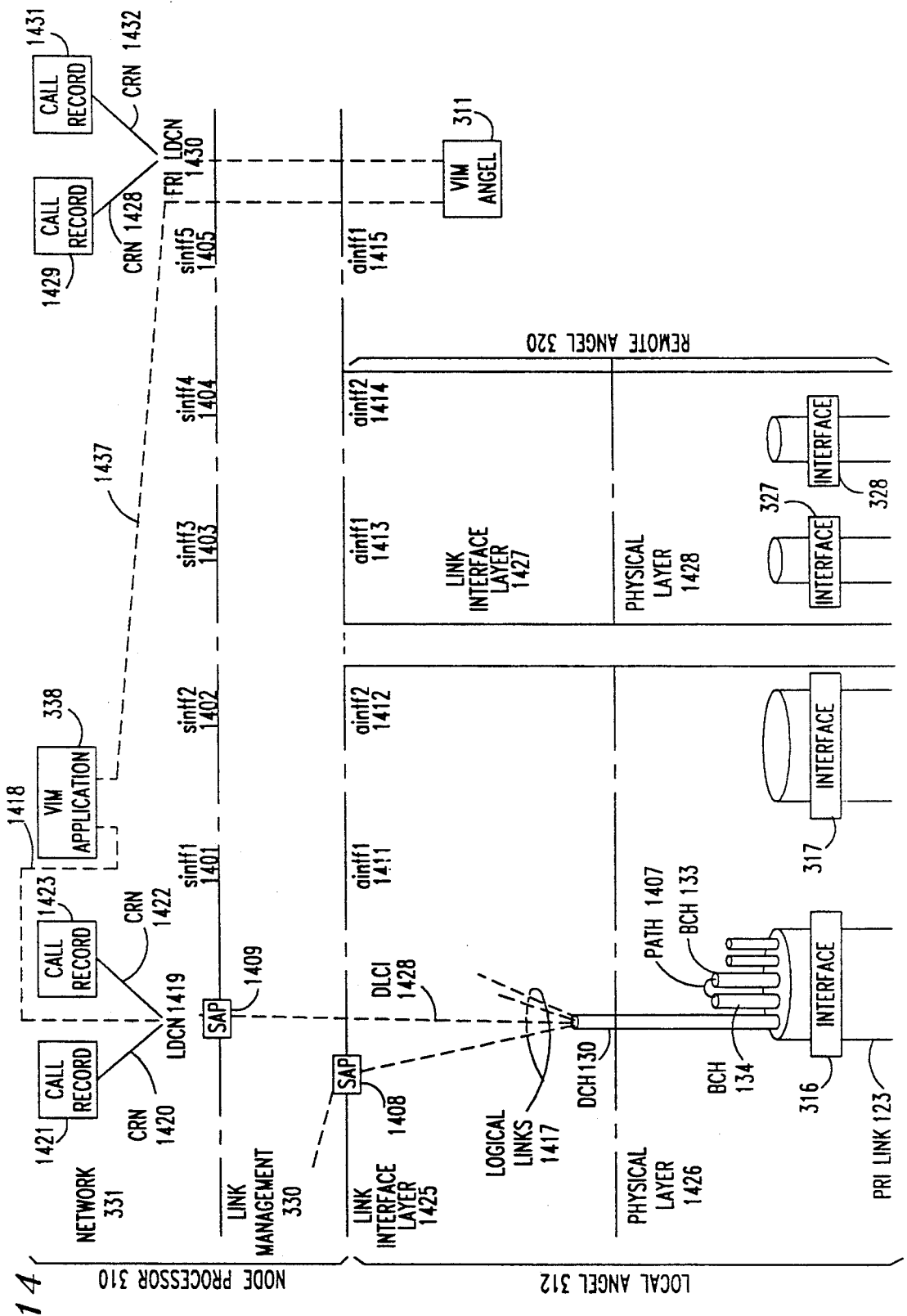

The following describes three more embodiments for communicating the FRI LDC of FRI link 350 between VIM applications 338 and 348 of FIG. 3. In the first embodiment as described in the previous paragraphs, the FRI LDC is communicated in the packetized subchannel of B channel 134 of PRI link 123 and B channel 139 of BRI link 126. The second embodiment communicates the FRI LDC of FRI link 350 by establishing a logical link in D channels 130 and 138 and is illustrated in FIG. 13. Such logical links are illustrated in FIG. 13. The third embodiment communicates the FRI LDC by establishing a communication path utilizing user-user temporary signaling information (call or non-call related) messages on LDCN 1419 and is illustrated in FIG. 14. The fourth embodiment is very similar to the first embodiment except that the B channel which is used to communicate the FRI LDC is not divided into subchannels. Rather, the entire B channel is packetized and used to communicate the FRI LDC. When the fourth embodiment is used in the previous examples, the other assigned B channel of the ISDN links is divided into two subchannels. The first subchannel is used for the first FRI B channel, and the second subchannel is used for the second FRI B channel. Using the second, third, or fourth embodiments, VIM application 338 and VIM angel 311 function together in the same manner as in the first embodiment to use the FRI link which conceptually terminates on a virtual interface. VIM application 348 and VIM angel 303 also perform similar functions as in the first embodiment.

Consider how the second embodiment establishes a logical link on D channels 130 and 138. As in the first embodiment, VIM application 338 uses the administered telephone number of terminal processor 301 to initially request that software layers 331 through 333 transmit a setup message with the telephone number in the called party number field. Also within an IE of codeset 6 of the setup message is the node number of node processor 310. In addition, the setup message requests that a packetized logical link be established on D channel 130. By transmitting the setup message, VIM application 338 is placing a call to VIM application 348.

The setup message is transmitted in the LDC of the D channel of PRI link 123, which had been established when PRI link 123 was set up, to central office 160. Central office 160 processes this request in a normal manner with respect to both switching node 101 and remote telemarketing terminal 104. The setup message requests a logical link in D channel 130, e.g. SAP 1310 (FIG. 13) in the present example. After establishment of the FRI LDC on SAP 1310, requests are made for two B channels. Central office 160 communicates with remote telemarketing terminal 104 via the LDC of D channel 138 of BRI link 126. VIM 348 answers this call, and messages are transmitted back and forth as before. Initially, the setup message is transferred to network layer 341. Network layer 1331 transfers the setup message to session layer 343 via transport layer 342. When the setup message is received, session layer 343 handles this call in the same manner as it would any other call. Session layer 343 is responsive to the telephone number, determines that the call is directed to VIM application 348 as an end point, and transfers the setup message to the application layer 345. Application layer 345 examines the dialed number in the called party number field and on that basis transfers the call setup request to VIM application 348.

If VIM application 348 chooses to accept the call upon receipt of the call setup message, VIM application 348 transmits down to the lower software layers a request that the logical link be established on D channel 138 and that an acknowledgment message be sent. In response, network layer 341 formulates a connection message that is then transferred back to node 101 via central office 160. Network 341 also negotiates with central office 160 for establishment of the logical link. Central office 160 is responsive to the connection message to establish a packet connection between a logical link (SAP 1310) in D channel 130 and a logical link in D channel 138. If VIM application 348 decides not to answer the message, then network layer 341 tears the call down by sending the proper messages to node processor 310 and central office 160.

After requesting the transmission of the connection message, VIM application 348 transmits a request to link management 340. In response, link management 340 requests that the link interface of local angel 304 establish the new logical link on D channel 138. A software path from the logical link is then created from local angel 304 through link management 340 and up to VIM application 348. The link interface of local angel 304 then establishes the LAPD logical link. As previously described with respect to FIG. 5, VIM application 348 then utilizes VIM angel 303 to inform software layers 340 through 346 that the virtual interface implemented by VIM angel 303 is being set up.

After setting up the logical link on D channel 130, VIM application 338 requests that set up messages be transmitted to interconnect B channel 134 to B channel 139 and B channel 135 to B channel 140 via central office 160. The resulting communication paths become two FRI B channels.

In setting up the virtual interface implemented by VIM angel 303, VIM application 348 maps the physical channel number (sintf and channel numbers) of interface 306 into the virtual channels numbers (aintf and channel numbers). In the present example, the logical link of D channel 130 becomes a FRI D channel which is illustratively assigned the number 24. B channel 135 is mapped into FRI channel 1, and B channel 134 is mapped into FRI channel 2. Furthermore, link management 340 identifies the virtual interface implemented by VIM angel 303 with a sintf and correlates this sintf with the VIM angel number and the aintf for the virtual interface. After this mapping and initialization of physical interfaces is completed, the FRI link is established between switching node 101 and remote telemarketing terminal 104.

After the connection message is received back from remote telemarketing terminal 104, VIM application 338 and VIM angel 311 perform the same functions as local angel 312 performs in notifying software layers 330 through 335 that a new interface has been set up. In response to the connection message, VIM application 338 sets up the virtual interface implemented by VIM angel 303 and transmits control information to local angel 312. In response, angel 312 establishes the logical link on D channel 130. FRI LDC of FRI link 350 is communicated via the logical link. In manner similar to VIM application 348, VIM application 338 maps and identifies the virtual interface implemented by VIM angel 311 in order to establish the FRI link. Details on setting up the FRI are given with respect to FIG. 5.

Consider how the third embodiment establishes a communication path to support FRI LDC of FRI link 350 using user-user temporary signaling. As in the first embodiment, VIM application 338 uses the administered telephone number of terminal processor 301 to initially request that software layers 331 through 333 transmit a setup message with the telephone number in the called party number field. Also within an IE of codeset 6 of the setup message is the node number of node processor 310. However, the setup message does not request a physical or link-level connection but rather a signaling connection.

The setup message is transmitted in the LDC of the D channel of PRI link 123, which had been established when PRI link 123 was set up, to central office 160. Central office 160 processes this request in a normal manner with respect to both switching node 101 and remote telemarketing terminal 104. The setup message requests an user-user temporary signaling connection. After establishment of the FRI LDC on the user-user temporary signaling connection, requests will be made for two B channels. Central office 160 communicates with remote telemarketing terminal 104 via the LDC of D channel 138 of BRI link 126. VIM application 348 answers this call, and messages are transmitted back and forth as before. Initially, the setup message is transferred to network layer 341. Network layer 1431 transfers the setup message to session layer 343 via transport layer 342. When the setup message is received, session layer 343 handles this call in the same manner as it would any other call. Session layer 343 is responsive to the telephone number, determines that the call is directed to VIM application 348 as an end point, and transfers the setup message to the application layer 345. Application layer 345 examines the dialed number in the called party number field and on that basis transfers the call setup request to VIM application 348.

If VIM application 348 chooses to accept the call upon receipt of the call setup message, VIM application 348 transmits down to the lower software layers a request that a user-user temporary signaling connection be established on D channel 138 and that an acknowledgement message be sent. In response, network layer 341 formulates a connection message that is then transferred back to node 101 via central office 160 and establishes the user-user temporary signaling connection to VIM application 348 for this call. If VIM application 348 decides not to answer the message, then network layer 341 tears the call down by sending the proper messages to node processor 310 and central office 160. As previously described with respect to FIG. 5, VIM application 348 then utilizes VIM angel 303 to inform software layers 340 through 346 that the virtual interface implemented by VIM angel 303 is being set up. Link management 340 is responsive for the virtual interface implemented by VIM angel 303 being set up to establish and identify FRI LDC of FRI link 350 as being communicated via the user-user temporary signaling connection.

After setting up the user-user temporary signaling connection, a VIM application 338 requests that set up messages be transmitted to interconnect B channel 134 to B channel 139 and B channel 135 to B channel 140 via central office 160. The resulting communication paths become two FRI B channels.

In setting up the virtual interface implemented by VIM angel 303, VIM application 348 maps the physical channel number (sintf and channel numbers) of interface 306 into the virtual channels numbers (aintf and channel numbers). In the present example, the user-user temporary signaling connection becomes a FRI D channel which is illustratively assigned the number 24. B channel 135 is mapped into FRI channel 1, and B channel 134 is mapped into FRI channel 2. Furthermore, link management 340 identifies the virtual interface implemented by VIM angel 303 with a sintf and correlates this sintf with the VIM angel number and the aintf for the virtual interface. After this mapping and initialization of physical interfaces is completed, the FRI link is established between switching node 101 and remote telemarketing terminal 104.

After the connection message is received back from remote telemarketing terminal 104, VIM application 338 and VIM angel 311 perform the same functions as local angel 312 performs in notifying software layers 330 through 335 that a new interface has been set up. In response to the connection message, VIM application 338 sets up the virtual interface implemented by VIM angel 303 and transmits control information to network layer 331. In response, network layer 331 establishes a user-user temporary signaling connection to VIM application 338. The FRI LDC of FRI link 350 is communicated via the user-user temporary signaling connection. In manner similar to VIM application 348, VIM application 338 maps and identifies the virtual interface implemented by VIM angel 311 in order to establish the FRI link. Details on setting up the FRI are given with respect to FIG. 5.

It is to be understood that the above-described embodiments are merely illustrative of the principles of the invention and that other arrangements may be devised by those skilled in the art without departing from the spirit and scope of the invention. In particular, other software and hardware structures may be used to implement the invention. Further, it would be apparent to one skilled in the art that a FRI link can have a number of B channels assigned to it. In addition, a FRI link can be established on an existing FRI link.

We claim:

1. A remote telemarketing terminal for communicating with a telemarketing system over a connecting ISDN link, said ISDN link having a plurality of transport channels and a signaling channel for communication of ISDN signaling information, said remote telemarketing terminal comprising means for establishing a virtual link between said terminal and said system over said transport channels, said virtual link including a virtual signaling channel established on one of said transport channels, and means for using ISDN signaling information communicated to said terminal over said virtual signaling channel to control said remote telemarketing terminal to provide telemarketing functions, that ISDN signaling information being distinct from ISDN signaling information communicated to said terminal via said signaling channel of said connecting ISDN link.

2. The remote telemarketing of claim 1 further comprising a processor to control the operation of said remote telemarketing terminal by executing a plurality of software layers arranged in a hierarchical structure and said establishing means comprises an application software module in a highest software layer and a virtual interface software module in lowest software layers and said connecting ISDN link directly controlled by the lowest software layers.

said lowest software layers responsive to encapsulated information received in said one of said transport channels for communicating said encapsulated information to said application software module, said application software module responsive to said encapsulated information from said one of said transport channels for recovering said ISDN signaling information from said virtual signaling channel and for transferring ISDN signaling information from said virtual signaling channel to said virtual interface software module, said virtual interface software module responsive to said ISDN signaling information from said virtual signaling channel for transferring said ISDN signaling information from said virtual signaling channel to an intermediate software layer, and said intermediate software layer through said highest software layer responsive to said ISDN signaling information from said virtual signaling channel to control said remote telemarketing terminal to provide said telemarketing functions.

3. The remote telemarketing terminal of claim 2 wherein said lowest software layers further responsive to other signaling information from said intermediate software layer designated for said signaling channel for communicating that signaling information on said signaling channel, said virtual interface software module responsive to other ISDN signaling information from said intermediate software layer for receiving that information in the same manner as said lowest software layers and for transferring said other ISDN signaling information to said application software module, and said application software module further responsive to said other ISDN signaling information received from said virtual interface software module for encapsulating that information for transmission on said one of said transport channels and for transferring said encapsulated other information to said lowest software layers for transmission on said one of said transport channels.

4. A remote telemarketing terminal for communicating with a telemarketing system over a connecting ISDN link, said ISDN link having a plurality of transport channels and a signaling channel for communication of ISDN signaling information, said remote telemarketing terminal comprising means for dividing one of said transport channels into subchannels, means for establishing a virtual link between said terminal and said system over said transport channels, said virtual link including a virtual signaling channel established on one of said subchannels, and means for using ISDN signaling information communicated to said terminal over said virtual signaling channel to control said remote telemarketing terminal to provide telemarketing functions, that ISDN signaling information being distinct from ISDN signaling information communicated to said terminal via said signaling channel of said connecting ISDN link.

5. The remote telemarketing terminal of claim 4 further comprising a processor to control the operation of said remote telemarketing terminal by executing a plurality of software layers arranged in a hierarchical structure and said establishing means comprises an application software module in a highest software layer and a virtual interface software module in said lowest software layers and said connecting ISDN link directly controlled by the lowest software layers, said lowest software layers responsive to encapsulated information received in said one of said subchannels for communicating said encapsulated information to said application software module, said application software module responsive to said encapsulated information from said one of said subchannels for recovering said ISDN signaling information and for transferring ISDN signaling information to said virtual interface software module, said virtual interface software module responsive to said ISDN signaling information for transferring said ISDN signaling information to an intermediate software layer, and said intermediate software layer through said highest software layer responsive to said ISDN signaling information to control said remote telemarketing terminal to provide said telemarketing functions.

6. The remote telemarketing terminal of claim 5 wherein said lowest software layers further responsive to other signaling information from said intermediate software layer designated for said signaling channel for communicating that signaling information on said signaling channel, said virtual interface software module responsive to other ISDN signaling information from said intermediate software layer for receiving that information in the same manner as said lowest software layers for transferring said other ISDN signaling information to said application software module, and said application software module further responsive to said other ISDN signaling information received from said virtual interface software module for encapsulating that information for transmission on said one of said subchannels and for transferring said encapsulated other information to said lowest software layers for transmission on said one of said subchannels.

7. A remote telemarketing terminal for communicating with a telemarketing system over a connecting ISDN link, said ISDN link having a plurality of transport channels and a signaling channel comprising a plurality of logical links with one of said logical links utilized for communication of ISDN signaling information to control said connecting ISDN link, said remote telemarketing terminal comprising means for establishing a virtual link between said terminal and said system, said virtual link is a virtual signaling channel established on another one of said logical links, and means for using ISDN signaling information communicated to said terminal over said virtual signaling channel to control said remote telemarketing terminal to provide telemarketing functions, that ISDN signaling information being distinct from ISDN signaling information communicated to said terminal via said signaling channel of said connecting ISDN link.

8. The remote telemarketing terminal of claim 7 further comprising a processor to control the operation of said remote telemarketing terminal by executing a plurality of software layers arranged in a hierarchical structure and said establishing means comprises an application software module in a highest software layer and a virtual interface software module in lowest software layers and said connecting ISDN link directly controlled by the lowest software layers, said lowest software layers responsive to encapsulated information received in said other one of said logical links for communicating said encapsulated information to said application software module, said application software module responsive to said encapsulated information from said other one of said logical links for recovering said ISDN signaling information and for transferring ISDN signaling information to said virtual interface software module, said virtual interface software module responsive to said ISDN signaling information for transferring said ISDN signaling information to an intermediate software layer, and said intermediate software layer through said highest software layer responsive to said ISDN signaling information to control said remote telemarketing terminal to provide said telemarketing functions.

9. The remote telemarketing terminal of claim 8 wherein said lowest software layers further responsive to other signaling information from said intermediate software layer designated for said signaling channel for communicating that signaling information on said signaling channel, said virtual interface software module responsive to other ISDN signaling information from said intermediate software layer for receiving that information in the same manner as said lowest software layers and for transferring said other ISDN signaling information to said application software module, and said application software module further responsive to said other ISDN signaling information received from said virtual interface software module for encapsulating that information for transmission on said other one of said logical links and for transferring said encapsulated other information to said lowest software layers for transmission on said other one of said logical links.

10. A remote telemarketing terminal for communicating with a telemarketing system over a connecting ISDN link, said ISDN link having a plurality of transport channels and a signaling channel for communication of ISDN signaling information and a user-user temporary connection, said remote telemarketing terminal comprising means for establishing a virtual link between said terminal and said system, said virtual link is a virtual signaling channel established using said user-user temporary connection in said signaling channel, and means for using ISDN signaling information communicated to said terminal over said virtual signaling channel to control said remote telemarketing terminal to provide telemarketing functions, that ISDN signaling information being distinct from ISDN signaling information communicated to said terminal via said signaling channel of said connecting ISDN link.

11. The remote telemarketing terminal of claim 10 further comprising a processor to control the operation of said remote telemarketing terminal by executing a plurality of software layers arranged in a hierarchical structure and said establishing means comprises an application software module in a highest software layer and a virtual interface software module in said lowest software layers and said connecting ISDN link directly controlled by the lowest software layers, said lowest software layers responsive to encapsulated information received on said user-user temporary connection from said signaling channel for communicating said encapsulated information to said application software module, said application software module responsive to said encapsulated information for recovering said ISDN signaling information and for transferring ISDN signaling information to said virtual interface software module, said virtual interface software module responsive to said ISDN signaling information for transferring said ISDN signaling information to an intermediate software layer, and said intermediate software layer through said highest software responsive to said ISDN signaling information to control said remote telemarketing terminal to provide said telemarketing functions.

12. The remote telemarketing terminal of claim 11 wherein said lowest software layers further responsive to other signaling information from said intermediate software layer designated for said signaling channel for communicating that signaling information on said signaling channel, said virtual interface software module respovise to other ISDN signaling information from said intermediate software layer for receiving that information in the same manner as said lowest software layers and for transferring said other ISDN signaling information to said application software module, and said application software module further responsive to said other ISDN signaling information received from said virtual interface software module for encapsulating that information for transmission on said user-user temporary connection in said signaling channel and for transferring said encapsulated other information to said lowest software layers for transmission on said user-user temporary connection in said signaling channel.

13. A remote telemarketing terminal for providing telemarketing services identical to those services provided by a plurality of local telemarketing terminals each directly connected by a direct standard link to a telemarketing system using a standard protocol and said remote telemarketing terminal interconnected to said telemarketing system by a connecting standard link from a switching system to a physical interface on said telemarketing system and by another connecting standard link from said switching system to another physical interface on said remote telemarketing terminal and each connecting link has a signaling channel for communication of signaling information using said standard protocol and a plurality of transport channels, said remote telemarketing terminal comprising:

means within said remote telemarketing terminal for assigning transport channels from said connecting standard links for use as a virtual link to provide communication between said remote telemarketing terminal and said telemarketing system, means within said remote telemarketing terminal for establishing a virtual signaling channel on said virtual link by using one of said transport channels of each of said connecting standard links in accordance with said standard protocol, means within said remote telemarketing terminal for cooperating with said telemarketing system to establish a virtual interface on said telemarketing system and for identifying said assigned transport channels and said virtual signaling channel as said virtual link interconnecting said virtual interface to said remote telemarketing terminal, and means in said remote telemarketing terminal for using signaling information communicated on said virtual signaling channel from said virtual interface utilizing said standard protocol and distinct from signaling information communicated via signaling channels of said connecting standard links to control said remote telemarketing terminal to provide telemarketing functions.

14. The apparatus of claim 13 wherein said standard protocol is the ISDN protocol.

15. The apparatus of claim 14 wherein said remote telemarketing terminal has a processor to control the operation of said remote telemarketing terminal by executing a plurality of software layers arranged in a hierarchical structure and said establishing means comprises an application software module in a highest software layer and said identifying means comprises a virtual interface software module in said lowest software layers and said other standard link directly controlled by the lowest software layers, said lowest software layers responsive to encapsulated information received in said one of said transport channels of said other standard link for communicating said encapsulated information to said application software module, said application software module responsive to said encapsulated information from said one of said transport channels of said other standard link for recovering said signaling information of said virtual signaling channel and for transferring that signaling information to said virtual interface software module, said virtual interface software module responsive to said signaling information of said virtual signaling channel for transferring said signaling information of said virtual signaling channel to an intermediate software layer, and said intermediate software layer through said highest software layer responsive to said signaling information of said virtual signaling channel to control said remote telemarketing terminal to provide said telemarketing functions.

16. The apparatus of claim 15 wherein said lowest software layers further responsive to other signaling information from said intermediate software layer designated for said signaling channel of said other standard link for communicating that signaling information on said signaling channel of said other standard link, said virtual interface software module responsive to other signaling information for said virtual signaling channel from said intermediate software layer for receiving that information in the same manner as said lowest software layers and for transferring said other signaling information to said application software module, said application software module further responsive to said other signaling information received from said virtual interface software module for encapsulating that information for transmission on said one of said transport channels of said other standard link and for transferring said encapsulated other information to said lowest software layers for transmission on said one of said transport channels of said other standard link.

17. A remote telemarketing terminal for providing telemarketing services identical to those services provided by a plurality of local telemarketing terminals each directly connected by a direct standard link to a telemarketing system using a standard protocol and said remote telemarketing terminal interconnected to said telemarketing system by a connecting standard link from a switching system to a physical interface on said telemarketing system and by another connecting standard link from said switching system to another physical interface on said remote telemarketing terminal and each connecting link has a signaling channel for communication of signaling information using said standard protocol and a plurality of transport channels, said remote telemarketing terminal comprising:

means within said remote telemarketing terminal for assigning transport channels from said connecting standard links for use as a virtual link to provide communication between said remote telemarketing terminal and said telemarketing system and for dividing one of said transport channels of each of said connecting standard links into subchannels, means within said remote telemarketing terminal for establishing a virtual signaling channel on said virtual link via one of said subchannels of each of said connecting standard links in accordance with said standard protocol, means within said remote telemarketing terminal for cooperating with said telemarketing system to establish a virtual interface on said telemarketing system and for identifying said assigned transport channels, the remaining subchannels, and said virtual signaling channel as said virtual link interconnecting said virtual interface to said remote telemarketing terminal, and means in said remote telemarketing terminal for using signaling information communicated on said virtual signaling channel from said virtual interface utilizing said standard protocol and distinct from signaling information communicated by signaling channels of said connecting standard links to control said remote telemarketing terminal to provide telemarketing functions.

18. The apparatus of claim 17 wherein said standard protocol is the ISDN protocol.

19. The apparatus of claim 18 wherein said remote telemarketing terminal has a processor to control the operation of said remote telemarketing terminal by executing a plurality of software layers arranged in a hierarchical structure and said establishing means comprises an application software module in a highest software layer and said identifying means comprises a virtual interface software module in said lowest software layers and said other standard link directly controlled by the lowest software layers, said lowest software layers responsive to encapsulated information received in said one of said subchannels of said other standard link for communicating said encapsulated information to said application software module, said application software module responsive to said encapsulated information from said one of said subchannels of said other standard link for recovering said signaling information of said virtual signaling channel and for transferring that signaling information to said virtual interface software module, said virtual interface software module responsive to said signaling information of said virtual signaling channel for transferring said signaling information of said virtual signaling channel to an intermediate software layer, and said intermediate software layers through said highest software layer responsive to said signaling information of said virtual signaling channel to control said remote telemarketing terminal to provide said telemarketing functions.

20. The apparatus of claim 19 wherein said lowest software layers further responsive to other signaling information from said intermediate software layer designated for said signaling channel of said other standard link for communicating that signaling information on said signaling channel of said other standard link, said virtual interface software module responsive to other signaling information for said virtual signaling channel from said intermediate software layer for receiving that information in the same manner as said lowest software layers and for transferring said other signaling information to said application software module, said application software module further responsive to said other signaling information received from said virtual interface software module for encapsulating that information for transmission on said one of said subchannels of said other standard link and for transferring said encapsulated other information to said lowest software layers for transmission on said one of said subchannels of said other standard link.

21. A remote telemarketing terminal for providing telemarketing services identical to those services provided by a plurality of local telemarketing terminals each directly connected by a direct standard link to a telemarketing system using a standard protocol and said remote telemarketing terminal interconnected to said telemarketing system by a connecting standard link from a switching system to a physical interface on said telemarketing system and by another connecting standard link from said switching system to another physical interface on said remote telemarketing terminal, and each connecting standard link has a plurality of transport channels and a signaling channel comprising a plurality of logical links with one of said logical links designated to carry signaling information of said connecting standard links in accordance with said standard protocol, said remote telemarketing terminal comprising:

- means within said remote telemarketing terminal for assigning transport channels from said connecting standard links for use as a virtual link to provide communication between said remote telemarketing terminal and said telemarketing system,
- means within said remote telemarketing terminal for establishing a virtual signaling channel on another one of said logical links of each of said connecting standard links in accordance with said standard protocol,
- means within said remote telemarketing terminal for cooperating with said telemarketing system to establish a virtual interface on said telemarketing system and for identifying said assigned transport channels and said virtual signaling channel as said virtual link interconnecting said virtual interface to said remote telemarketing terminal, and
- means in said remote telemarketing terminal for using signaling information communicated on said virtual signaling channel from said virtual interface utilizing said standard protocol and distinct from signaling information communicated by signaling channels of said connecting standard links to control said remote telemarketing terminal to provide telemarketing functions.

22. The apparatus of claim 21 wherein said standard protocol is the ISDN protocol.

23. The apparatus of claim 22 wherein said remote telemarketing terminal has a processor to control the operation of said remote telemarketing terminal by executing a plurality of software layers arranged in a hierarchical structure and said establishing means comprises an application software module in a highest software layer and said identifying means comprises a virtual interface software module in said lowest software layers and said other standard link directly controlled by the lowest software layers, said lowest software layers responsive to encapsulated information received in said other one of said logical links for communicating said encapsulated information to said application software module, said application software module responsive to said encapsulated information from said other one of said logical links for recovering said signaling information of said virtual signaling channel and for transferring that signaling information to said virtual interface software module, said virtual interface software module responsive to said signaling information of said virtual signaling channel for transferring said signaling information of said virtual signaling channel to an intermediate software layer, and said intermediate software layer through said highest software layer responsive to said signaling information of said virtual signaling channel to control said remote telemarketing terminal to provide said telemarketing functions.

24. The apparatus of claim 23 wherein said lowest software layers further responsive to other signaling information from said intermediate software layer designated for said signaling channel of said other standard link for communicating that signaling information on said signaling channel of said other standard link, said virtual interface software module responsive to other signaling information for said virtual signaling channel from said intermediate software layer for receiving that information in the same manner as said lowest software layers and for transferring said other signaling information to said application software module, said application software module further responsive to said other signaling information received from said virtual interface software module for encapsulating that information for transmission on said other one of said logical links and for transferring said encapsulated other information to said lowest software layers for transmission on said other one of said logical links.

25. A remote telemarketing terminal for providing telemarketing services identical to those services provided by a plurality of local telemarketing terminals each directly connected by a direct standard link to a telemarketing system using a standard protocol and said remote telemarketing terminal interconnected to said telemarketing system by a connecting standard link from a switching system to a physical interface on said telemarketing system and by another connecting standard link from said switching system to another physical interface on said remote telemarketing terminal and each connecting link has a signaling channel for communication of signaling information using said standard protocol and a plurality of transport channels and said standard protocol allows for a user—user temporary connection in said signaling channels of said connecting standard links in addition to said signaling information, said remote telemarketing terminal comprising:

- means within said remote telemarketing terminal for assigning transport channels from said connecting standard links for use as a virtual link to provide communication between said remote telemarketing terminal and said telemarketing system,
- means within said remote telemarketing terminal for establishing a virtual signaling channel on said virtual link using said user—user temporary connection in said signaling channels of said connecting standard links in accordance with said standard protocol,
- means within said remote telemarketing terminal for cooperating with said telemarketing system to establish a virtual interface on said telemarketing system and for identifying said assigned transport channels and said virtual signaling channel as said virtual link interconnecting said virtual interface to said remote telemarketing terminal, and
- means in said remote telemarketing terminal for using signaling information communicated on said virtual signaling channel from said virtual interface utilizing said standard protocol and distinct from signaling information communicated by signaling channels of said connecting standard links to control said remote telemarketing terminal to provide telemarketing functions.

26. The apparatus of claim 25 wherein said standard protocol is the ISDN protocol.

27. The apparatus of claim 25 wherein said remote telemarketing terminal has a processor to control the operation of said remote telemarketing terminal by executing a plurality of software layers arranged in a hierarchical structure and said establishing means comprises an application software module in a highest software layer and said identifying means comprises a virtual interface software module in said lowest software layers and said other standard link directly controlled by the lowest software layers, said lowest software layers responsive to encapsulated information received by said communication of user information in said signaling channel of said other standard link for communicating said encapsulated information to said application software module, said application software module responsive to said encapsulated information received by said communication of user information in said signaling channel of said other standard link for recovering said signaling information of said virtual signaling channel and for transferring that signaling information to said virtual interface software module, said virtual interface software module responsive to said signaling information of said virtual signaling channel for transferring said signaling information of said virtual signaling channel to an intermediate software layer, and said intermediate software layer through said highest software layer responsive to said signaling information of said virtual signaling channel to control said remote telemarketing terminal to provide said telemarketing functions.

28. The apparatus of claim 27 wherein said lowest software layers further responsive to other signaling information from said intermediate software layer designated for said signaling channel of said other standard link for communicating that signaling information on said signaling channel of said other standard link, said virtual interface software module responsive to other signaling information for said virtual signaling channel from said intermediate software layer for receiving that information in the same manner as said lowest software layers and for transferring said other signaling information to said application software module, said application software module further responsive to said other signaling information received from said virtual interface software module for encapsulating that information for transmission on said user—user temporary connection in said signaling channel of said other standard link and for transferring said encapsulated other information to said lowest software layers for transmission on said user—user temporary connection in said signaling channel.

29. A remote telecommunication terminal for communicating with a telecommunication system over a connecting ISDN link, said ISDN link having a plurality of transport channels and a signaling channel for communication of ISDN signaling information, said remote telecommunication terminal comprising means for establishing a virtual link between said telecommunication terminal and said system over said transport channels, said virtual link including a virtual signaling channel established on one of said transport channels, and means for using ISDN signaling information communicated to said telecommunication terminal over said virtual signaling channel to control said remote telemarketing terminal to provide telemarketing functions, that ISDN signaling information being distinct from ISDN signaling information communicated to said telecommunication terminal via said signaling channel of said connecting ISDN link.

30. The remote telecommunication terminal of claim 29 further comprising a processor to control the operation of said remote telecommunication terminal by executing a plurality of software layers arranged in a hierarchical structure and said establishing means comprises an application software module in a highest software layer and a virtual interface software module in said lowest software layers and said connecting ISDN link directly controlled by the lowest software layers, said lowest software layers responsive to encapsulated information received from said virtual link of said one of said transport channels for communicating said encapsulated information to said application software module, said application software module responsive to said encapsulated information from said one of said transport channels for recovering said ISDN signaling information of said virtual link and for transferring ISDN signaling information of said virtual link to said virtual interface software module, said virtual interface software module responsive to said ISDN signaling information of said virtual link for transferring said ISDN signaling information of said virtual link to an intermediate software layer, and said intermediate software layer through said highest software layer responsive to said ISDN signaling information of said virtual link to control said telecommunication functions provided by said remote telecommunication terminal.

31. The remote telecommunication terminal of claim 30 wherein said lowest software layers further responsive to other signaling information from said intermediate software layer designated for said signaling channel for communicating that signaling information on said signaling channel, said virtual interface software module responsive to other ISDN signaling information from said intermediate software layer for receiving that information in the same manner as said lowest software layers and for transferring said other ISDN signaling information to said application software module, said application software module further responsive to said other ISDN signaling information received from said virtual interface software module for encapsulating that information for transmission on said one of said transport channels and for transferring said encapsulated other information to said lowest software layers for transmission on said one of said transport channels.

32. A remote telecommunication terminal for communicating with a telecommunication system over a connecting ISDN link, said ISDN link having a plurality of transport channels and a signaling channel for communication of ISDN signaling information, said remote telecommunication terminal comprising means for dividing one of said channels into subchannels, means for establishing a virtual link between said terminal and said system over said one of transport channels, said virtual link including a virtual signaling channel established on one of said subchannels, and means for using ISDN signaling information communicated to said terminal over said virtual signaling channel to control said remote telemarketing terminal to provide telemarketing functions, that ISDN signaling information being distinct from ISDN signaling information communicated to said terminal via said signaling channel of said connecting ISDN link.

33. The remote telecommunication terminal of claim 32 further comprising a processor to control the operation of said remote telecommunication terminal by executing a plurality of software layers arranged in a hierarchical structure and said establishing means comprises an application software module in a highest software layer and a virtual interface software module in said lowest software layers and said connecting ISDN link directly controlled by the lowest software layers, said lowest software layers responsive to encapsulated information received in said one of said subchannels for communicating said encapsulated information to said application software module, said application software module responsive to said encapsulated information from said one of said subchannels for recovering said ISDN signaling information of said virtual link and for transferring ISDN signaling information of said virtual link to said virtual interface software module, said virtual interface software module responsive to said ISDN signaling information of said virtual link for transferring said ISDN signaling information of said virtual link to an intermediate software layer, and said intermediate software layer through said highest software layer responsive to said ISDN signaling information to control said telecommunication functions provided by said remote telecommunication terminal.

34. The remote telecommunication terminal of claim 33 further responsive to other signaling information from said intermediate software layer designated for said signaling channel for communicating that signaling information on said signaling channel, said virtual interface software module responsive to other ISDN signaling information from said intermediate software layer for receiving that information in a similar manner as said lowest software layers and for transferring said other ISDN signaling information to said application software module, said application software module further responsive to said other ISDN signaling information received from said virtual interface software module for encapsulating that information for transmission on said one of said subchannels and for transferring said encapsulated other information to said lowest software layers for transmission on said one of said subchannels.

35. A remote telecommunication terminal for communicating with a telecommunication system over a connecting ISDN link, said ISDN link having a plurality of transport channels and a signaling channel comprising a plurality of logical links with one of said logical links utilized for communication of ISDN signaling information to control said connecting ISDN link, said remote telecommunication terminal comprising means for establishing a virtual link between said terminal and said system, said virtual link is a virtual signaling channel established on another one of said logical links, and means for using ISDN signaling information communicated to said terminal over said virtual signaling channel to control said remote telemarketing terminal to provide telemarketing functions, that ISDN signaling information being distinct from ISDN signaling information communicated to said terminal via said signaling channel of said connecting ISDN link.

36. The remote telecommunication terminal of claim 35 further comprising a processor to control the operation of said remote telecommunication terminal by executing a plurality of software layers arranged in a hierarchical structure and said establishing means comprises an application software module in a highest software layer and a virtual interface software module in said lowest software layers and said connecting ISDN link directly controlled by the lowest software layers, said lowest software layers responsive to encapsulated information received in said other one of said logical links for communicating said encapsulated information to said application software module, said application software module responsive to said encapsulated information from said other one of said logical links for recovering said ISDN signaling information of said virtual link and for transferring ISDN signaling information of said virtual link to said virtual interface software module, said virtual interface software module responsive to said ISDN signaling information for transferring said ISDN signaling information of said virtual link to an intermediate software layer, and said intermediate software layer through said highest software layer responsive to said ISDN signaling information of said virtual link to control said remote telemarketing terminal to provide said telemarketing functions.

37. The remote telecommunication terminal of claim 36 wherein said lowest software layers further responsive to other signaling information from said intermediate software layer designated for said signaling channel for communicating that signaling information on said signaling channel, said virtual interface software module responsive to other ISDN signaling information from said intermediate software layer for receiving that information in the same manner as said lowest software layers and for transferring said other ISDN signaling information to said application software module, said application software module further responsive to said other ISDN signaling information received from said virtual interface software module for encapsulating that information for transmission on said other one of said logical links and for transferring said encapsulated other information to said lowest software layers for transmission on said other one of said logical links.

38. A remote telecommunication terminal for communicating with a telecommunication system over a connecting ISDN link, said ISDN link having a plurality of transport channels and a signaling channel for communication of ISDN signaling information and user information, said remote telecommunication terminal comprising means for establishing a virtual link between said terminal and said system, said virtual link is a virtual signaling channel established using a user-user temporary connection in said signaling channel, and means for using ISDN signaling information communicated to said terminal over said virtual signaling channel to control said remote telemarketing terminal to provide telemarketing functions, that ISDN signaling information being distinct from ISDN signaling information communicated to said terminal via said signaling channel of said connecting ISDN link.

39. The remote telecommunication terminal of claim 38 further comprising a processor to control the operation of said remote telecommunication terminal by executing a plurality of software layers arranged in a hierarchical structure and said establishing means comprises an application software module in a highest software layer and a virtual interface software module in said lowest software layers and said connecting ISDN link directly controlled by the lowest software layers, said lowest software layers responsive to encapsulated information received on said user-user temporary connection from said signaling channel for communicating said encapsulated information to said application software module, said application software module responsive to said encapsulated information for recovering said ISDN signaling information of said virtual link and for transferring ISDN signaling information of said virtual link to said virtual interface software module, said virtual interface software module responsive to said ISDN signaling information of said virtual link for transferring said ISDN signaling information of said virtual link to an intermediate software layer, and said intermediate software layer through said highest software layer responsive to said ISDN signaling information to control said remote telemarketing terminal to provide said telemarketing functions.

40. The remote telecommunication terminal of claim 39 wherein said lowest software layers further responsive to other signaling information from said intermediate software layer designated for said signaling channel for communicating that signaling information on said signaling channel, said virtual interface software module responsive to other ISDN signaling information from said intermediate software layer for receiving that information in the same manner as said lowest software layers and for transferring said other ISDN signaling information to said application software module, said application software module further responsive to said other ISDN signaling information received from said virtual interface software module for encapsulating that information for transmission on said user-user temporary connection is said signaling channel and for transferring said encapsulated other information to said lowest software layers for transmission on said user-user temporary connection in said signaling channel.

41. A method for operating a remote telemarketing terminal to communicate with a telemarketing system over a connecting ISDN link, said ISDN link having a plurality of transport channels and a signaling channel for communication of ISDN signaling information, said method comprising the steps of establishing a virtual link between said terminal and said system over said transport channels, and virtual link including a virtual signaling channel established on one of said transport channels, and using ISDN signaling information communicated to said terminal over said virtual signaling channel to control said remote telemarketing terminal to provide telemarketing functions, that ISDN signaling information being distinct from ISDN signaling information communicated to said terminal via said signaling channel of said connecting ISDN link.

42. The method of claim 41 wherein said remote telemarketing terminal has a processor to control the operation of said remote telemarketing terminal by executing a plurality of software layers arranged in a hierarchical structure and with an application software module in a highest software layer and a virtual interface software module in lowest software layers, said connecting ISDN link directly controlled by the lowest software layers and said establishing step comprises the steps of communicating encapsulated information from said one of said transport links to said application software module by said lowest software layers in response to said encapsulated information being received in said one of said transport channels, recovering said ISDN signaling information of said virtual link and transferring said ISDN signaling information of said virtual link to said virtual interface software module by said application software module in response to said encapsulated information from said one of said transport channels, transferring said ISDN signaling information of said virtual link to an intermediate software layer by said virtual interface software module in response to said ISDN signaling information of said virtual link, and said using step comprises the step of controlling said remote telemarketing terminal to provide said telemarketing functions, by said intermediate software layer through said highest software layer in response to said ISDN signaling information.

43. The method of claim 42 wherein said establishing step further comprises the steps of communicating other signaling information on said signaling channel by said lowest software layers in response to said other signaling information from said intermediate software layer designated for said signaling channel, receiving other ISDN information in the same manner as said lowest software layers and transferring said other ISDN signaling information to said application software module by said virtual interface software module in response to that information from said intermediate software layer, and encapsulating said other ISDN signaling information for transmission on said one of said transport channels and transferring said encapsulated other information to said lowest software layers for transmission on said one of said transport channels by said application software module in response to said other ISDN signaling information being received from said virtual interface software module.

44. A method for operating a remote telemarketing terminal to communicate with a telemarketing system over a connecting ISDN link, said ISDN link having a plurality of transport channels and a signaling channel for communication of ISDN signaling information, said method comprising the steps of dividing one of said transport channels into subchannels, establishing a virtual link between said terminal and said system over said transport channels, said virtual link including a virtual signaling channel established on one of the subchannels, and using ISDN signaling information communicated to said terminal over said virtual signaling channel to control said remote telemarketing terminal to provide telemarketing functions, that ISDN signaling information being distinct from ISDN signaling information communicated to said terminal via said signaling channel of said connecting ISDN link.

45. The method of claim 44 wherein said remote telemarketing terminal has a processor to control the operation of said remote telemarketing terminal by executing a plurality of software layers arranged in a hierarchical structure and with an application software module in a highest software layer and a virtual interface software module in lowest software layers, said connecting ISDN link directly controlled by the lowest software layers, and said establishing step comprises the steps of communicating encapsulated information to said application software module by said lowest software layers in response to said encapsulated information being received in said one of said subchannels, recovering said ISDN signaling information of said virtual link and transferring said ISDN signaling information of said virtual link to said virtual interface software module by said application software module in response to said encapsulated information from said one of said subchannels, transferring said ISDN signaling information of said virtual link to an intermediate software layer by said virtual interface software module in response to said ISDN signaling information of said virtual link, and said using step comprises the step of controlling said remote telemarketing terminal to provide said telemarketing functions, by said intermediate software layer through said highest software layer in response to said ISDN signaling information.

46. The method of claim 45 wherein said establishing step further comprises the steps of communicating other signaling information on said signaling channel by said lowest software layers in response to said other signaling information from said intermediate software layer designated for said signaling channel, receiving other ISDN information in the same manner as said lowest software layers and transferring said other ISDN signaling information to said application software module by said virtual interface software module in response to that information from said intermediate software layer, and encapsulating said other ISDN signaling information for transmission on said one of said subchannels and transferring said encapsulated other information to said lowest software layers for transmission on said one of said subchannels by said application software module in response to said other ISDN signaling information being received from said virtual interface software module.

47. A method for operating a remote telemarketing terminal to communicate with a telemarketing system over a connecting ISDN link, said ISDN link having a plurality of transport channels and a signaling channel comprising a plurality of logical links with one of said logical links utilized for communication of ISDN signaling information to control said connecting ISDN link, said method comprising the steps of establishing a virtual link between said terminal and said system, said virtual link is a virtual signaling channel established on another one of said logical links, and using ISDN signaling information communicated to said terminal over said virtual signaling channel to control said remote telemarketing terminal to provide telemarketing functions, that ISDN signaling information being distinct from ISDN signaling information communicated to said terminal via said signaling channel of said connecting ISDN link.

48. The method of claim 47 wherein said remote telemarketing terminal has a processor to control the operation of said remote telemarketing terminal by executing a plurality of software layers arranged in a hierarchical structure and with an application software module in a highest software layer and a virtual interface software module in lowest software layers, said connecting ISDN link directly controlled by the lowest software layers, and said establishing step comprises the steps of communicating encapsulated information to said application software module by said lowest software layers in response to said encapsulated information being received in said other one of said logical links, recovering said ISDN signaling information of said virtual link and transferring said ISDN signaling information of said virtual link to said virtual interface software module by said application software module in response to said encapsulated information from said other one of said logical links, transferring said ISDN signaling information to an intermediate software layer by said virtual interface software module in response to said ISDN signaling information of said virtual link, and said using step comprises the step of controlling said remote telemarketing terminal to provide said telemarketing functions by said intermediate software layer through said highest software layer in response to said ISDN signaling information.

49. The method of claim 48 wherein said establishing step further comprises the steps of communicating other signaling information on said signaling channel by said lowest software layers in response to said other signaling information from said intermediate software layer designated for said signaling channel, receiving other ISDN information in a similar manner as said lowest software layers and transferring said other ISDN signaling information to said application software module by said virtual interface software module in response to that information from said intermediate software layer, and encapsulating said other ISDN signaling information for transmission on said other one of said logical links and transferring said encapsulated other information to said lowest software layers for transmission on said other one of said logical links by said application software module in response to said other ISDN signaling information being received from said virtual interface software module.

50. A method for operating a remote telemarketing terminal to communicate with a telemarketing system over a connecting ISDN link, said ISDN link having a plurality of transport channels and a signaling channel for communication of ISDN signaling information and user information, said method comprising the steps of establishing a virtual link between said terminal and said system, said virtual link is a virtural signaling channel established using a user-user temporary connection in said signaling channel, and using ISDN signaling information communicated to said terminal over said virtual signaling channel to control said remote telemarketing terminal to provide telemarketing functions, that ISDN signaling information being distinct from ISDN signaling information communicated to said terminal via said signaling channel of said connecting ISDN link.

51. The method of claim 50 wherein said remote telemarketing terminal has a processor to control the operation of said remote telemarketing terminal by executing a plurality of software layers arranged in a hierarchical structure and with an application software module in a highest software layer and a virtual interface software module in lowest software layers, said connecting ISDN link directly controlled by the lowest software layers and said establishing step comprises the steps of communicating encapsulated information to said application software module by said lowest software layers in response to said encapsulated information being received as said user information from said signaling channel, recovering said ISDN signaling information of said virtual link and transferring said ISDN signaling information of said virtual link to said virtual interface software modulue by said application software module in response to said encapsulated information on said user-user temporary connection of said signaling channel, transferring said ISDN signaling information of said virtual link to an intermediate software layer by said virtual interface software module in response to said ISDN signaling information of said virtual link, and said using step comprises the step of controlling said remote telemarketing terminal to provide said telemarketing functions by said intermediate software layer through said highest software layer in response to said ISDN signaling information of said virtual link.

52. The method of claim 51 wherein said establishing step further comprises the steps of communicating other signaling information on said signaling channel by said lowest software layers in response to said other signaling information from said intermediate software layer designated for said signaling channel, receiving other ISDN information in a similar manner as said lowest software layers and transferring said other ISDN signaling information to said application software module by said virtual interface software module in response to that information from said intermediate software layer, and encapsulating said other ISDN signaling information for transmission as said user information on said signaling channel and transferring said encapsulated other information to said lowest software layers for transmission as said user information on said signaling channel by said application software module in response to said other ISDN signaling information being received from said virtual interface software module.

* * * * *